United States Patent
Saito

(10) Patent No.: US 11,372,607 B2
(45) Date of Patent: Jun. 28, 2022

(54) SERVER SYSTEM TO PREVENT INQUIRY TO SUGGEST PRINT AND STORAGE MEDIUM

(71) Applicant: CANON KABUSHIKI KAISHA, Tokyo (JP)

(72) Inventor: Kazuyuki Saito, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/951,642

(22) Filed: Nov. 18, 2020

(65) Prior Publication Data
US 2021/0165621 A1    Jun. 3, 2021

(30) Foreign Application Priority Data

Nov. 28, 2019  (JP) .............................. JP2019-215449

(51) Int. Cl.
*G06F 3/12* (2006.01)

(52) U.S. Cl.
CPC .......... *G06F 3/1256* (2013.01); *G06F 3/1262* (2013.01); *G06F 3/1285* (2013.01)

(58) Field of Classification Search
CPC combination set(s) only.
See application file for complete search history.

(56) References Cited

U.S. PATENT DOCUMENTS

| | | | |
|---|---|---|---|
| 9,019,523 B2* | 4/2015 | Itogawa | H04N 1/00244 358/1.14 |
| 2015/0029552 A1* | 1/2015 | Nishizawa | G06F 3/1288 358/1.15 |
| 2019/0294394 A1* | 9/2019 | Oikawa | G06F 3/1222 |
| 2020/0099799 A1* | 3/2020 | Obayashi | H04L 51/18 |
| 2020/0259767 A1* | 8/2020 | Walters | H04L 51/02 |
| 2020/0304437 A1* | 9/2020 | Sasamae | H04N 1/00506 |
| 2020/0304439 A1* | 9/2020 | Matsumoto | H04L 51/02 |
| 2020/0344375 A1* | 10/2020 | Ishii | G06F 3/1228 |
| 2021/0119944 A1* | 4/2021 | Kim | G06F 40/35 |
| 2021/0203795 A1* | 7/2021 | Okabayashi | H04N 1/00411 |

FOREIGN PATENT DOCUMENTS

JP    2019-164653 A    9/2019

* cited by examiner

*Primary Examiner* — Helen Zong
(74) *Attorney, Agent, or Firm* — Canon U.S.A., Inc. IP Division

(57) ABSTRACT

A control method is provided that causes a server system to perform operations that include detecting that a file has been uploaded, determining whether to display an inquiry about performing print of the uploaded file, and controlling a display unit to display the inquiry in response to a determination to display the inquiry in the determining and not to display the inquiry in response to a determination not to display the inquiry in the determining.

11 Claims, 20 Drawing Sheets

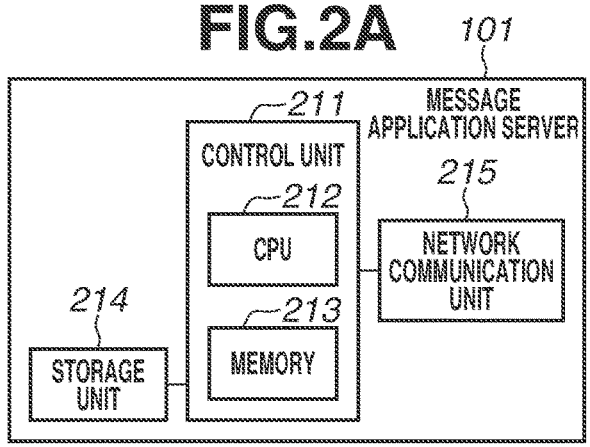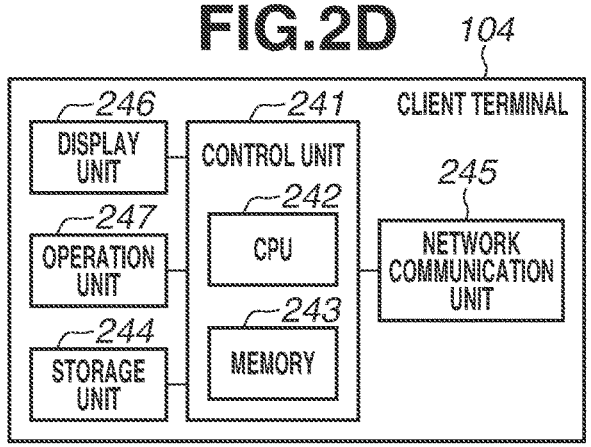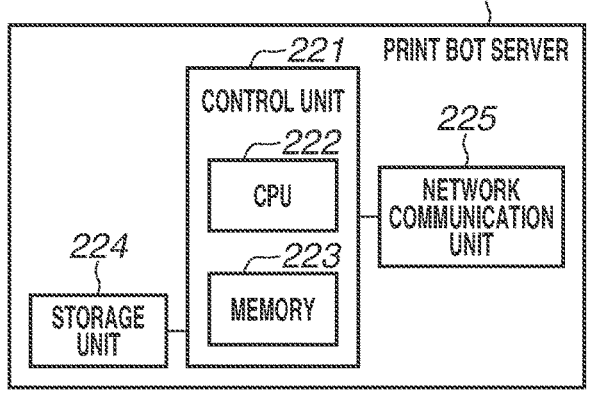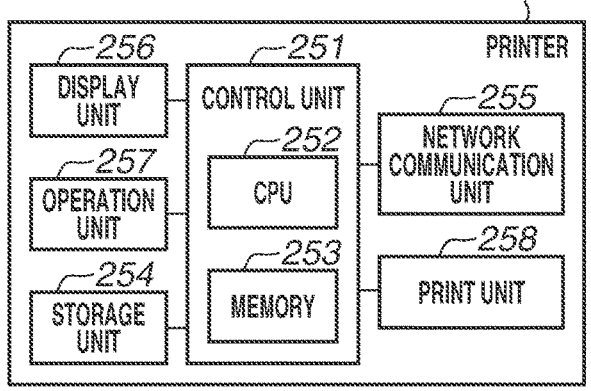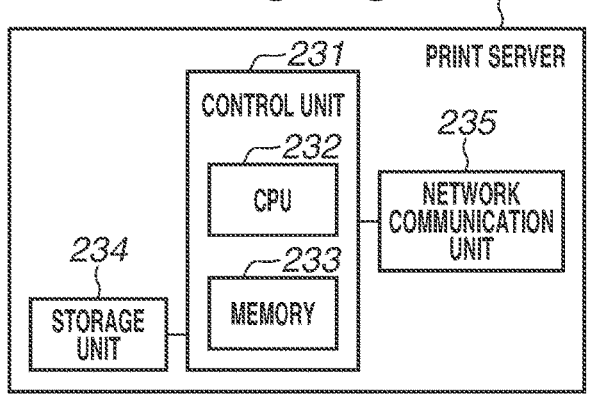

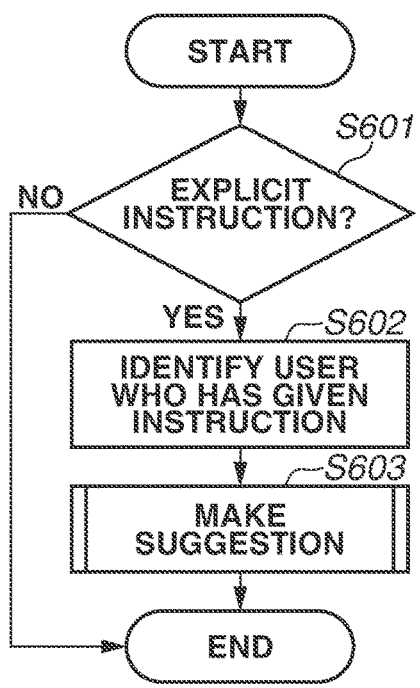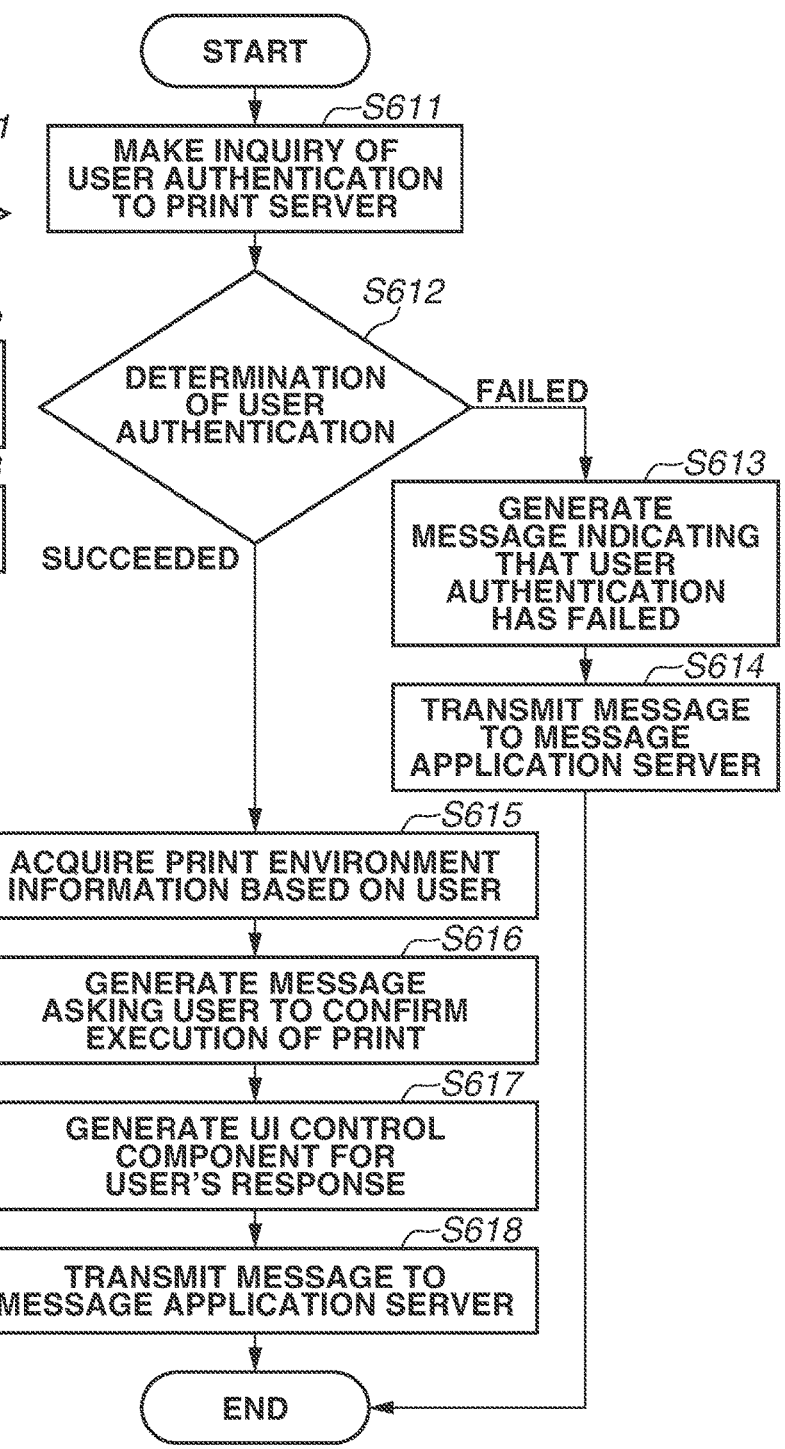

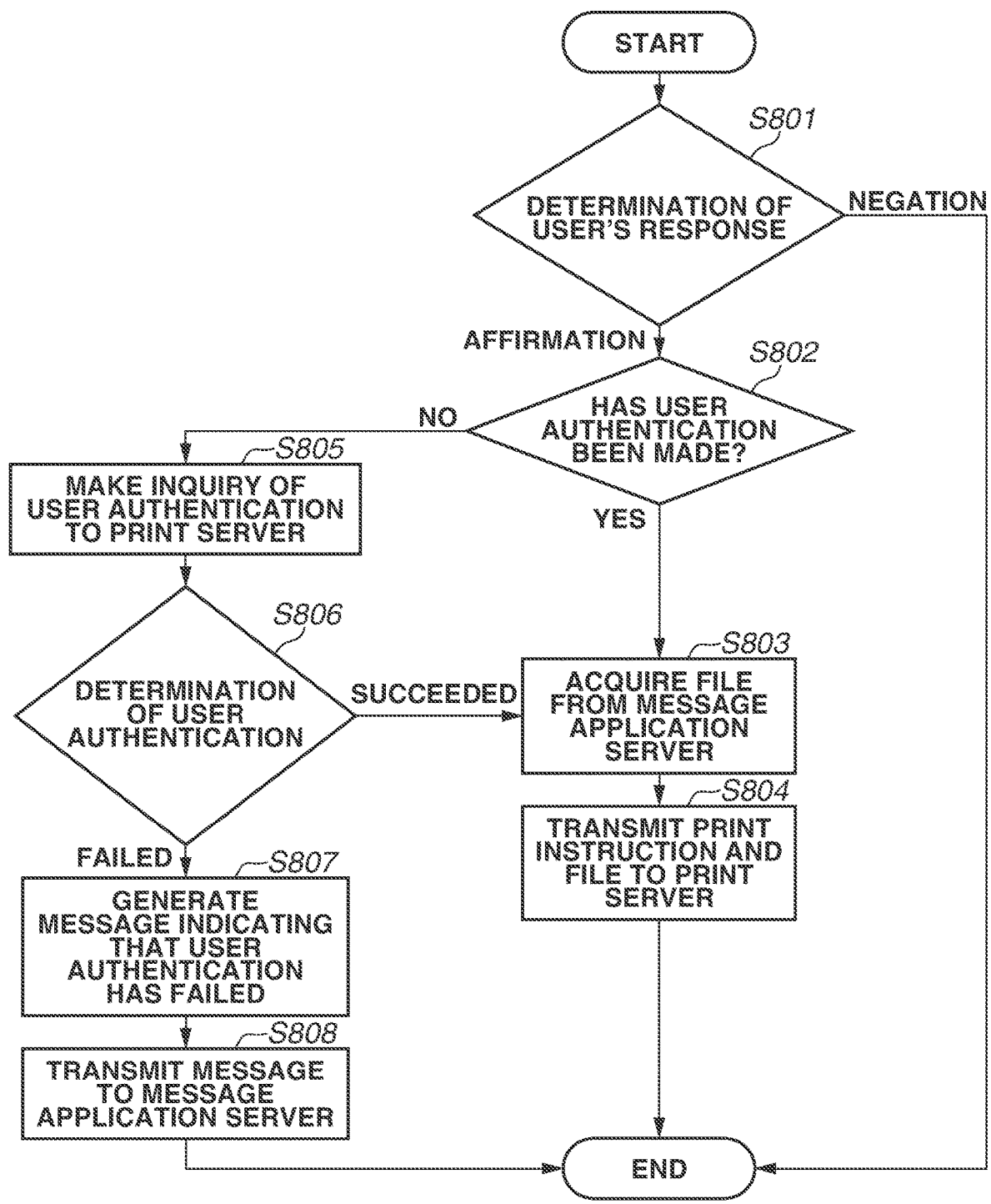

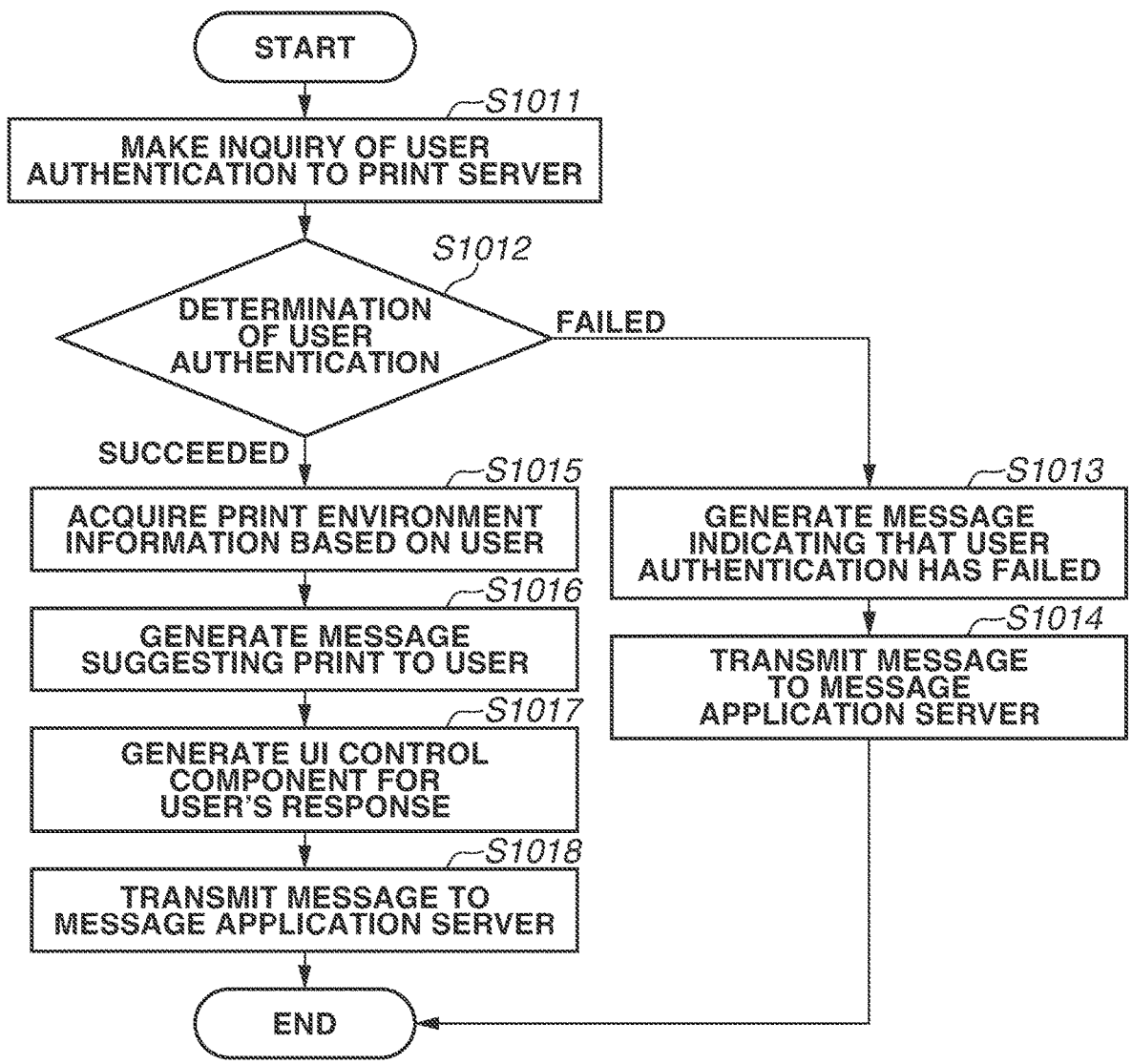

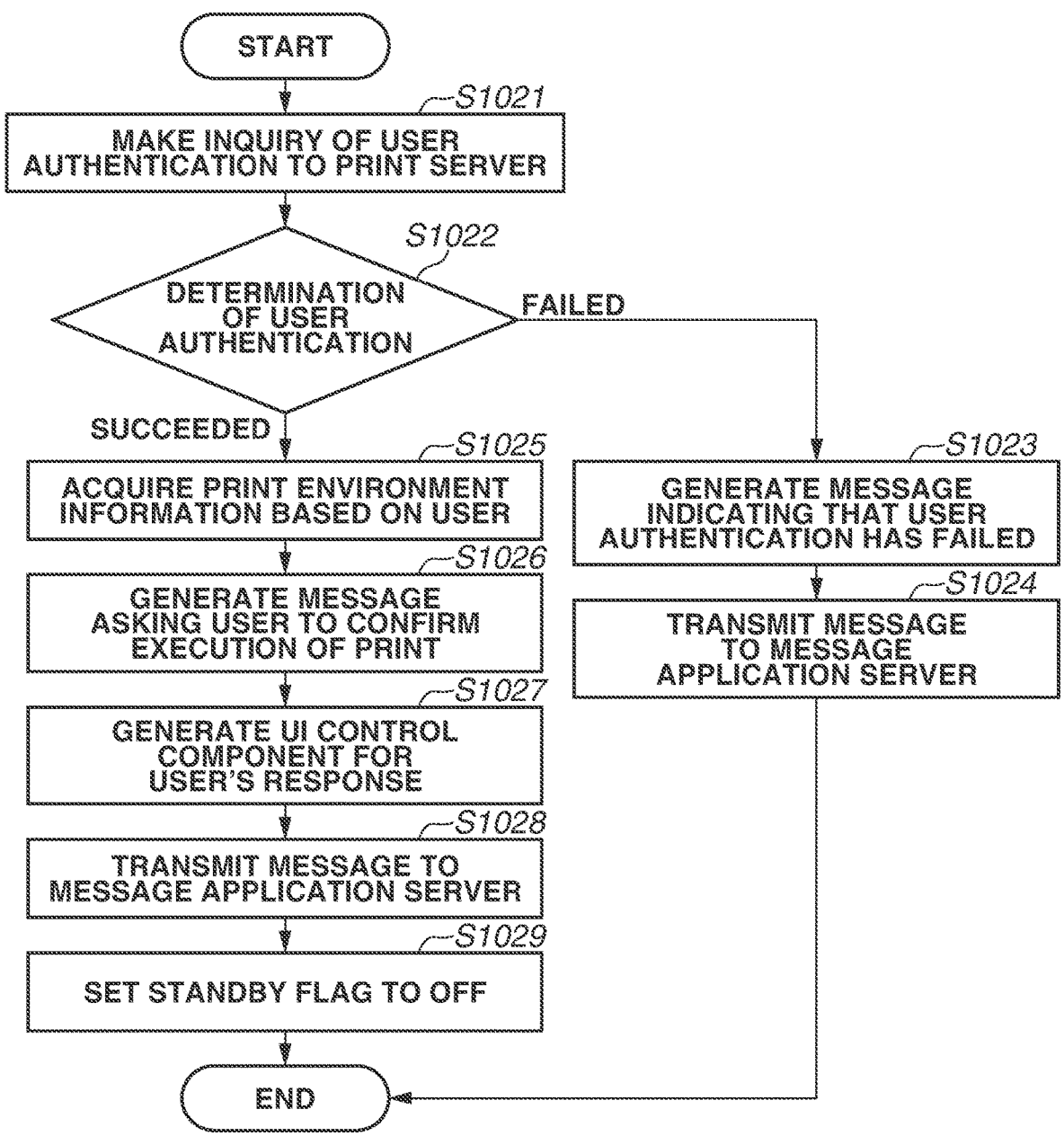

FIG.18A

```
{
    "event_type": "message",  ~1801
    "user": "User A",
    "text": "Can anyone give me the document?",
    "time": "20191028143051",
    "room": "Project-A",
    "room_type": "group"  ~1802
}
```

FIG.18B

```
{
    "event_type": "message",
    "user": "User C",
    "text": "URL=file://yyyy",
    "time": "20191028143824",
    "room": "Print_Bot",
    "room_type": "individual"  ~1803
}
```

FIG.18C

```
{
    "event_type": "mention",  ~1804
    "user": "User C",
    "text": "@Print_Bot, please print file xxxx.",  ~1805
    "time": "20191028144024",
    "room": "Project-A",
    "room_type": "group"
}
``` ical embodiment.

SERVER SYSTEM TO PREVENT INQUIRY TO SUGGEST PRINT AND STORAGE MEDIUM

BACKGROUND

Field of the Disclosure

The present disclosure relates to a server system to prevent an inquiry to suggest print, and a control method thereof.

Description of the Related Art

Messaging applications for so-called business chats to exchange messages among user terminals via networks have been in widespread use. Recent years have seen an increase in service using, what is called, a bot that automatically returns a message based on the content of a message transmitted by a user on a messaging application, among these messaging applications. Meanwhile, printing machines also have been equipped with network communication functions with the spread of cloud services, and cloud print services have been provided that receive print instructions given by users from terminals via networks.

Coordination between a cloud print service and a bot service as described above allows a user to give a print instruction to a printing machine via a messaging application on a terminal in a form of interaction with the bot service. In performing print on the messaging application via a print bot, a print suggestion by the print bot to the user is convenient.

However, intervention of the print bot in conversation with other users may be an obstacle to the conversation with the other users.

Japanese Patent Application Laid-Open No. 2019-164653 discusses a method of preventing such intervention by manually switching between a mode of executing a print service in response to a specific message and a mode of not executing the print service.

SUMMARY

According to embodiments of the present disclosure, a control method is provided that causes a server system to perform operations that include detecting that a file has been uploaded, determining whether to display an inquiry about performing print of the uploaded file, and controlling a display unit to display the inquiry in response to a determination to display the inquiry in the determining and not to display the inquiry in response to a determination not to display the inquiry in the determining.

Further features of the present disclosure will become apparent from the following description of exemplary embodiments with reference to the attached drawings.

BRIEF DESCRIPTION OF THE DRAWINGS

FIGS. 2A to 2E are block diagrams illustrating client terminal, printer, and various server hardware configurations according to the first exemplary embodiment.

FIGS. 6A and 6B are flowcharts each illustrating an example of processing of the bot service according to the first exemplary embodiment.

FIG. 8 is a flowchart illustrating an example of processing of the bot service according to the first exemplary embodiment.

FIGS. 10A to 10C are flowcharts each illustrating an example of processing of a bot service according to a third exemplary embodiment.

FIGS. 18A to 18C are diagrams each illustrating an example of event metadata information according to the first exemplary embodiment.

DESCRIPTION OF THE EMBODIMENTS

Exemplary embodiments of the present disclosure will be described below with reference to the accompanying drawings.

Figure 1:
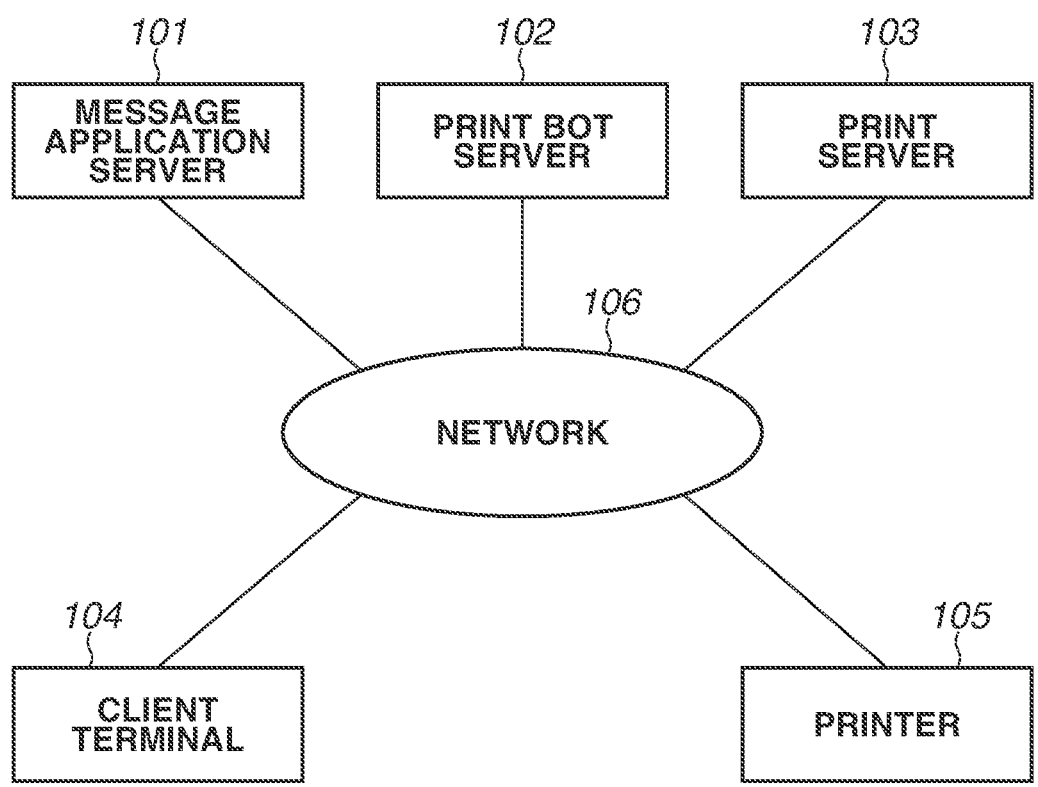
FIG. 1 is a block diagram illustrating a system configuration according to a first exemplary embodiment.

FIG. 1 is a block diagram illustrating a configuration of a print bot system according to a first exemplary embodiment. In the following description of the exemplary embodiments, a sever is described as a single server, but a system composed of a plurality of servers may be employed in practice. A system composed of a single server or a plurality of servers is referred to as a server system. A message application server 101, a print bot server 102, a print server 103, a client terminal 104, a printer 105 are connected to one another via a network 106. Whereas FIG. 1 illustrates one client terminal 104 and one printer 105, typically a plurality of client terminals 104 and a plurality of printers 105 are provided in practice. Each server may be configured such that loads are distributed to a plurality of servers. In contrast, one physical server may be configured to virtually play a role of a plurality of servers within the server. Each server may be a cloud server on the cloud. The network 106 is assumed to be a wide area network (WAN) such as the Internet, but may be a closed environment such as an in-house local area network (LAN). The client terminal 104 refers to, for example, a personal computer (PC), a tablet, or a smartphone, all of which are a terminal directly operated by a user. Freely-selected application software is executable on the client terminal 104. The printer 105 is a device that actually performs print on physical paper, and converts print data received via the network 106 into image data to print the image data. The message application server 101 provides the client terminal 104 with a messaging service such as a chat service. The print bot server 102 is registered as a virtual user in the messaging service provided by the message application server 101, and transmits/receives a message as if an ordinary user did. The print server 103 plays a role in accepting a print instruction and document data from the outside, converting the document data into print data, and thereafter transmitting the print data to the predetermined printer 105 to give a print instruction to the predetermined printer 105. The print server 103 placed in a cloud environment may be referred to as a cloud print server. The system of determining a timing to cause the printer 105 to perform print may be a push-type system that does not require a user's operation on the printer 105 or a pull-type system of starting print after a user operates to start print being performed on the printer 105.

A description will be given of a hardware configuration of each device in the system according to the present exemplary embodiment with reference to FIGS. 2A to 2C.

FIG. 2A is a block diagram illustrating a hardware configuration of the message application server 101. The message application server 101 includes a storage unit 214, a control unit 211, and a network communication unit 215. The storage unit 214 refers to a nonvolatile storage device such as a hard disk drive (HDD) and a solid state drive (SSD), and can save and rewrite digital data.

The control unit 211 is composed of a central processing unit (CPU) 212 and a memory 213, and controls entire operations of the message application server 101. The CPU 212 loads a program stored in the storage unit 214 into the memory 213 and executes the program. The memory 213 is a main memory of the CPU 212, and is used as a work area and a temporary storage area to execute various kinds of programs.

The network communication unit 215 is a device to communicate with the external network 106, and input or output digital data from or to an external server and/or a client terminal via the network 106.

FIG. 2B is a block diagram illustrating a hardware configuration of the print bot server 102. The print bot server 102 includes a storage unit 224, a control unit 221, and a network communication unit 225. A description of each unit will be equivalent to that of each unit of the message application server 101 and therefore be omitted.

FIG. 2C is a block diagram illustrating a hardware configuration of the print server 103. The print server 103 includes a storage unit 234, a control unit 231, and a network communication unit 235. Similarly, a description of each unit will be omitted.

FIG. 2D is a block diagram illustrating a hardware configuration of the client terminal 104. The client terminal 104 includes a display unit 246, an operation unit 247, a storage unit 244, a control unit 241, and a network communication unit 245. The display unit 246 is a device, such as a liquid crystal display, to display visual information in real time to the user. The operation unit 247 is a device to accept an input by the user via a keyboard, a mouse, or other input devices. A device with functions of both the display unit 246 and the operation unit 247, such as a touch panel, may be used. Respective descriptions of the storage unit 244, the control unit 241, and the network communication unit 245 will be equivalent to those of the message application server 101 and therefore be omitted.

FIG. 2E is a block diagram illustrating a hardware configuration of the printer 105. The printer 105 includes a display unit 256, an operation unit 257, a storage unit 254, a control unit 251, a network communication unit 255, and a print unit 258. The display unit 256 is a device that is attached to the printer 105, such as a touch panel and a light emitting diode (LED) display, to display information in real time to the user. The operation unit 257 is a device to accept an input by the user and may include hard keys such as a numeric keypad in addition to a touch panel. Respective descriptions of the storage unit 254 and the control unit 251 will be equivalent to those of the message application server 101 and therefore be omitted. The network communication unit 255 is a device to communicate with the external network 106, and mainly plays a role of, for example, receiving print data, and transmitting a status of the printer 105, such as an error, to an external server. The print unit 258 is a device that performs a sequence of operations of feeding, printing, and discharging of paper prepared in a cassette or a tray to perform print processing. The print system is not limited to an electrophotographic system or an inkjet system. A duplex print unit that is used at the time of discharge and a finishing device that performs stapling, punching, or other finishing operations are also included in the print unit 258. While the description of the present exemplary embodiment illustrates a single function printer that serves only a print function as an example of the printer 105, a multi-function printer (a multi-function peripheral) that has both a scan function and a fax function may be used.

A description will be given of a software configuration of each device in the system according to the present exemplary embodiment with reference to FIGS. 3A to 3D.

Figure 3A:
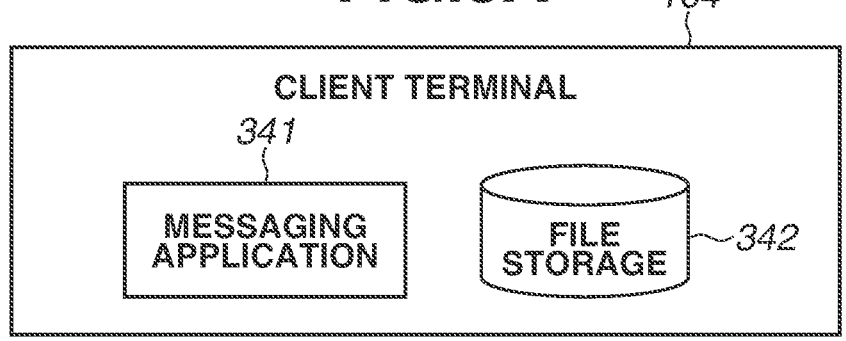
FIGS. 3A to 3D are block diagrams illustrating client terminal and various server software configurations according to the first exemplary embodiment.

FIG. 3A is a block diagram illustrating a software configuration of the client terminal 104. A messaging application 341 is a software application that plays a role as an interface with the user in a network service such as a business chat service. Specifically, the messaging application 341, for example, accepts an input of a message by the user via the operation unit 247 and transmits the message to the message application server 101, or accepts an instruction by the user for uploading a file and transmits the file to the message application server 101. If a message is input by another user to the messaging application 341 the messaging application 341 receives a notification from the message application server 101 and causes the display unit 246 to display the message in real time. The message type may be, in addition to a typical character string and/or image, a user interface (UI) control component (a component on a graphical user interface (GUI)), such as a button and a combo box, which is transmitted from, for example, the print bot server 102. The messaging application 341 also plays a role in transmitting predetermined action information in response to an operation of the UI control component by the user. A file storage 342 is an area for saving user files prepared in the storage unit 244 of the client terminal 104, and the user can save a freely-selected file, including a file created in another application (not illustrated), in the file storage 342. The messaging application 341 has the authority to access the file storage 342.

Figure 3B:
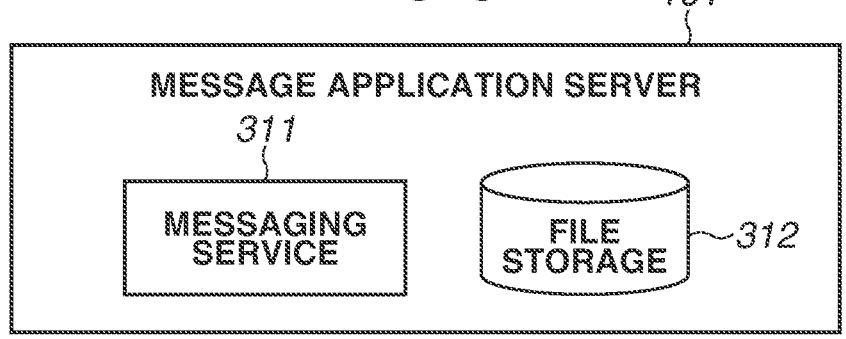

FIG. 3B is a block diagram illustrating a software configuration of the message application server 101. A messaging service 311 is a software application that provides a network service such as a business chat service. The messaging service 311 exchanges information with a plurality of client terminals 104 and/or the print bot server 102 connected to the network 106. The messaging service 311 manages users and exchanges information only with users and bots registered in advance. This configuration enables the messaging service 311 to share confidential information or other information among them. In the present exemplary embodiment, the registered users and bots are referred to as members. The messaging service 311 transmits a message received from a member to other members in real time. The messaging service 311 saves a received file in a file storage 312 and notifies the other members of that. In response to the messaging service 311 receiving action information described above, the messaging service 311 transmits the information to a server registered in advance (e.g., the print bot server 102). The file storage 312 is an area prepared in the storage unit 214 of the message application server 101. The messaging service 311 uses member information managed by the messaging service 311, and various kinds of messages and files received from members, all of which are stored in the file storage 312.

Figure 3C:
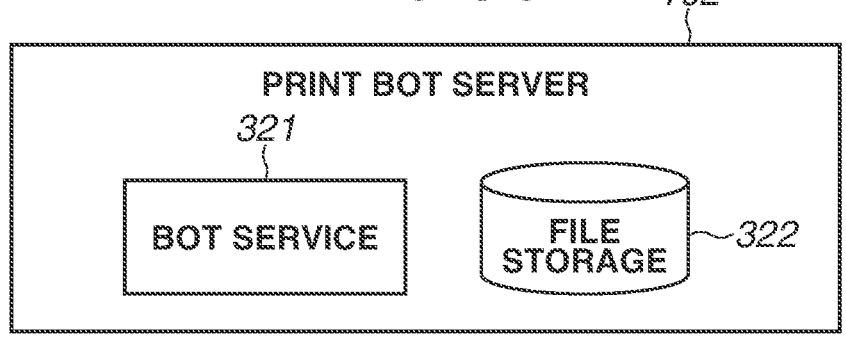

FIG. 3C is a block diagram illustrating a software configuration of the print bot server 102. A bot service 321 receives, for example, a message from the messaging service 311 of the message application server 101, and executes processing based on the content thereof. Specifically, the bot service 321, for example, transmits a message to the message application server 101 in collaboration with the print server 103 in response to a print request of the user, and gives the print instruction to the print server 103 in response to a print instruction. A file storage 322 is an area prepared in the storage unit 224 of the print bot server 102. The file storage 322 stores print settings and preview images used by the bot service 321 (a software program installed in the print bot server 102) in creation of a message by the bot service 321.

Figure 3D:
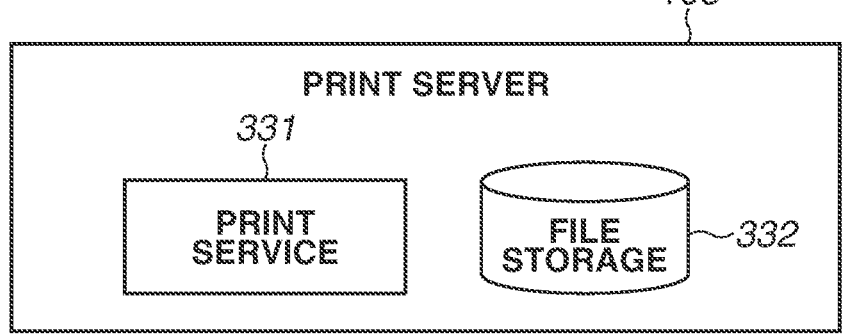

FIG. 3D is a block diagram illustrating a software configuration of the print server 103. A print service 331 is a service to transmit print data received from the outside to a registered printer (e.g., the printer 105) via the network 106 to cause the printer to execute print. A file storage 332 is an area prepared in the storage unit 234 of the print server 103. The print service 331 uses user information registered in the print service 331, information regarding each user's own printer(s), default print settings for each user, a print setting list, or other information, all of which are stored in the file storage 332.

Descriptions will be given of each application processing and each service processing according to the present exemplary embodiment with reference to FIGS. 4 to 8, FIGS. 14A and 14B, and FIGS. 18A to 18C.

Figure 4:
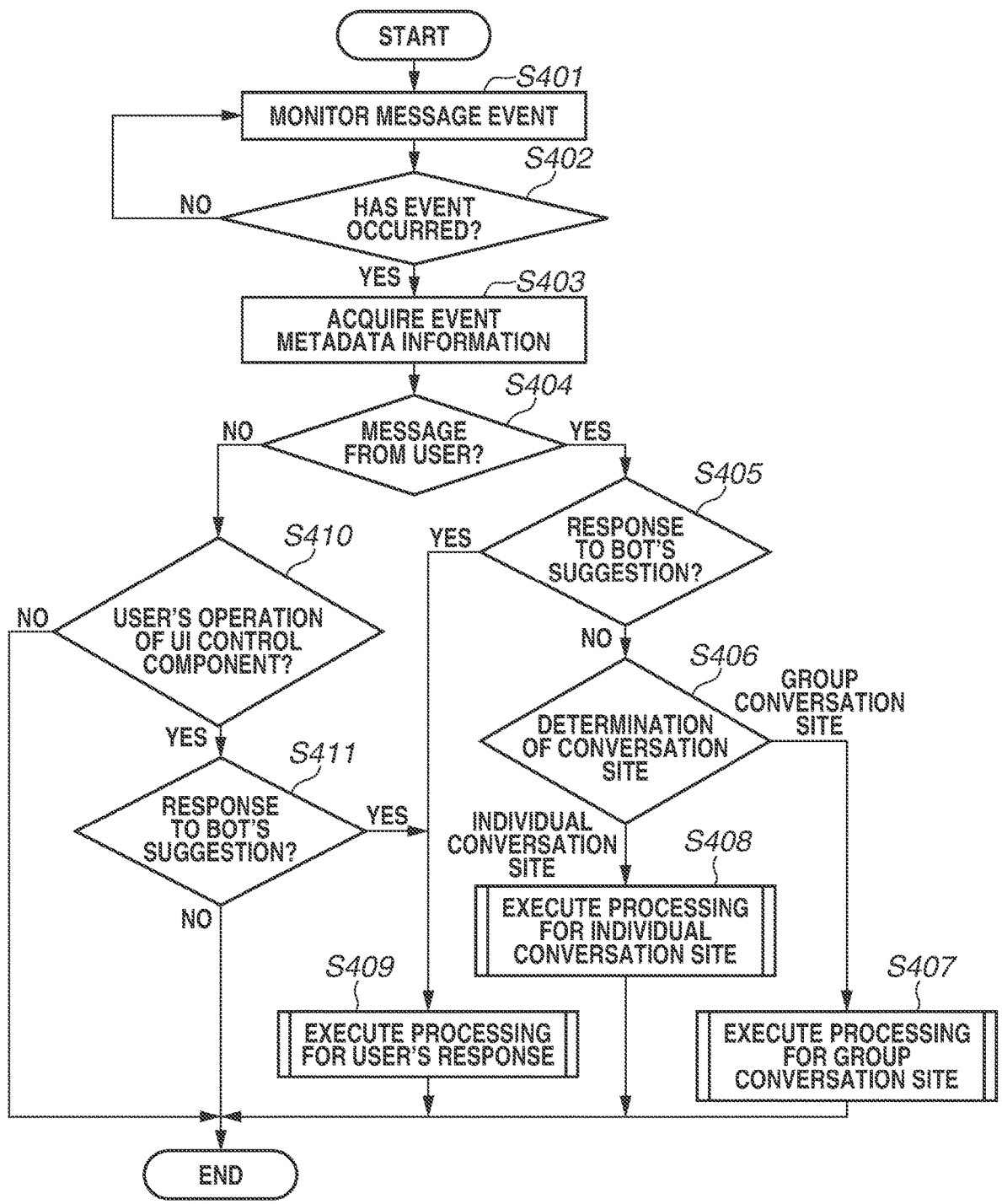
FIG. 4 is a flowchart illustrating an example of processing of a bot service according to the first exemplary embodiment.

The processes illustrated in FIG. 4 are operated by a CPU 222 executing the program after a program of the bot service 321 stored in the storage unit 224 of the print bot server 102 is loaded to a memory 223.

In step S401, the bot service 321 monitors an event transmitted from the message application server 101. In step S402, the bot service 321 determines whether the event has occurred. Events include an upload event of a file. If the event transmitted from the message application server 101 has occurred (YES in step S402), the bot service 321 detects the event and the processing proceeds to step S403. In step S403, the bot service 321 detects the event and acquires event metadata information (refer to FIGS. 18A to 18C) as information of the event. In step S404, the bot service 321 determines whether the event that has occurred is a message from the user. For example, there is a method of determination using a specific parameter in print metadata. For example, FIGS. 18A to 18C each illustrate an example of the event metadata information, and a parameter of "event_type" refers to an event type. In this example, if a value 1801 of the parameter of "event_type" is "message" as illustrated in FIG. 18A, the parameter indicates that the event is a message from the user. If the bot service 321 determines that the event is a message from the user (YES in step S404), the processing proceeds to step S405. In step S405, the bot service 321 determines based on the content of the message whether the message is a response by the user to a suggestion by a bot. For example, the message that includes a word indicating affirmation/negation such as "Yes/No", and "OK/cancel" is determined to be a response to the suggestion. The message that includes a specific word such as "please print" is determined to be an instruction to the bot. If the bot service 321 determines that the message from the user is not a response by the user to the bot's suggestion (NO in step S405), the processing proceeds to step S406. In step S406, the bot service 321 determines whether the conversation site is a "group conversation site" at which a plurality of members is in conversation or an "individual conversation site" at which a member is in one-to-one conversation with the bot. Details will be described below with reference to FIGS. 5A and 5B. If the conversation site is determined to be a group conversation site (GROUP CONVERSATION SITE in step S406), the processing proceeds to step S407. In step S407, the bot service 321 executes processing for the group conversation site. Details will be described below with reference to FIGS. 6A and 6B. If the conversation site is determined to be an individual conversation site (INDIVIDUAL CONVERSATION SITE in step S406), the processing proceeds to step S408. In step S408, the bot service 321 executes processing for the individual conversation site. Details will be described below with reference to FIGS. 7A and 7B. If the message is determined to be a response by the user to the bot's suggestion (YES in step S405), the processing proceeds to step S409. In step S409, the bot service 321 executes processing for the response by the user. Details will be described below with reference to FIG. 8. In contrast, if the event that has occurred is determined to be not a message from the user (NO in step S404), the processing proceeds to step S410. In step S410, the bot service 321 determines whether the event is an operation of a UI control component by the user, such as "YES" and "NO" arranged on a UI. If the event is determined to be not an operation of a UI control component (NO in step S410) by the user, the bot service 321 determines that the event is not an event related to the bot service, and ends the processing with respect to the event in the bot service. If the event is determined to be an operation of a UI control component (YES in step S410), the processing proceeds to step S411. In step S411, the bot service 321 determines whether the message is a response to the bot's suggestion. The bot service 321 makes determination, for example, based on whether a specific UI control component in the presented message is operated. If the message is determined to be not a response to the bot's suggestion (NO in step S410), the bot service 321 determines that the event is not an event related to the bot service, and ends the processing with respect to the event in the bot service. If the message is determined to be a response to the bot's suggestion (YES in step S411), the processing proceeds to step S409. In step S409, the bot service 321 executes the processing for the user's response.

Figure 5A:
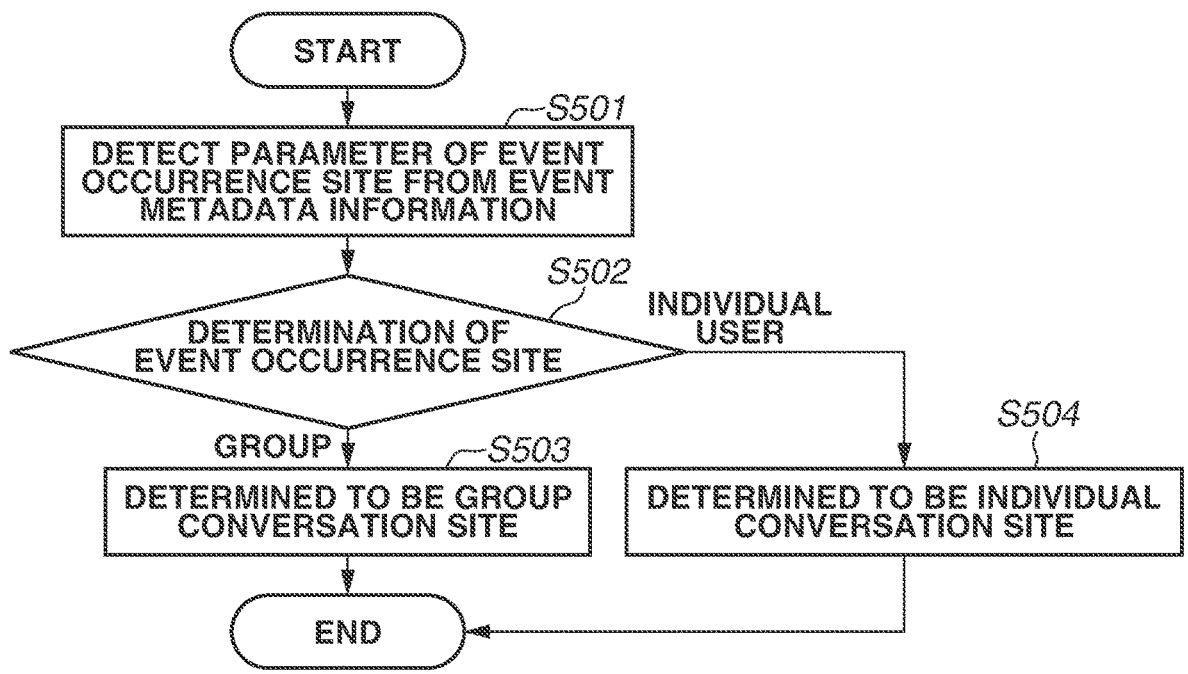
FIGS. 5A and 5B are flowcharts each illustrating an example of processing of the bot service according to the first exemplary embodiment.
Figure 5B:
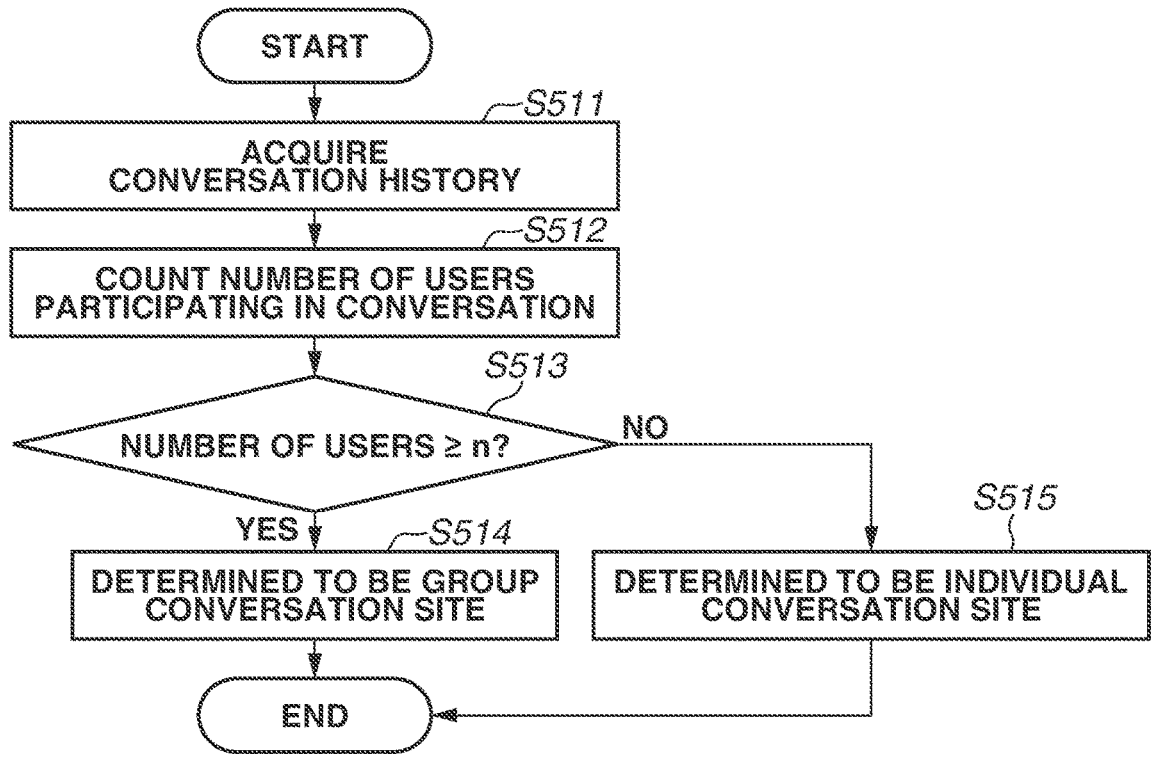

FIGS. 5A and 5B each illustrate an example of a method of determining a conversation site.

FIG. 5A illustrates an example of determining a conversation site based on an event occurrence site.

Processing in step S501 of the flowchart in FIG. 5A is started as a result of determination by the bot service 321 that the event that has occurred is a message from the user and not a response to the bot's suggestion.

In step S501, the bot service 321 detects a parameter indicating an event occurrence site from the event metadata information. Subsequently, in step S502, the bot service 321 determines the event occurrence site from the detected parameter. For example, FIGS. 18A to 18C each illustrate an example of the event metadata information, and a parameter of "room_type" refers to an event occurrence site. In step S502, the bot service 321 detects the "room_type", and determines whether the event occurrence site is a site in which a group participates or a site in which an individual user participates according to the value of the parameter. In the example illustrated in FIG. 18A, if a value 1802 of the parameter of "room_type" is "group" (GROUP in step S502), the bot service 321 determines that the event occurrence site is a message exchange site for the group and the processing proceeds to step S503. Consequently, in step S503, the bot service 321 determines that the event occurrence site is a group conversation site at which members gather together to be in conversation. In the example illustrated in FIG. 18B, a value 1803 of the parameter of "room_type" is "individual" (INDIVIDUAL USER in step S502), the bot service 321 determines that the event occurrence site is a dedicated message exchange site for one member, and the processing proceeds to step S504. Consequently, in step S504, the event occurrence site is determined to be an individual conversation site. The term "site" refers to a chat room. Alternatively, whether the event occurrence site is a group conversation site or an individual conversation site may be determined based on the number of members in actual conversation, instead of a value of the parameter of the event occurrence site.

FIG. 5B illustrates an example of determining a conversation site based on the number of people in conversation.

Processing in step S511 of the flowchart in FIG. 5B is started as a result of determination by the bot service 321 that the event that has occurred is a message from the user.

In step S511, the bot service 321 acquires a conversation history from the message application server 101. Subsequently, in step S512, the bot service 321 counts the number of users who participate in conversation excluding the bot from the data of the conversation history. Subsequently, in step S513, the bot service 321 determines whether the counted number of users excluding the bot is n or greater. If the number of users is n or greater (YES in step S513), the processing proceeds to step S514. In step S514, the bot service 321 determines that the conversation site is a group conversation site with a group in conversation. If the number of users is less than n (NO in step S513), the processing proceeds to step S515. In step S515, the bot service 321 determines that the conversation site is an individual conversation site. The determination is made typically with n=2 in the description above. However, if the print bot is permitted to intervene in conversation among a specific small number of members, the bot service 321 changes n according to the specific small number of people.

The method described above provides an increased convenience provided by the print bot for substantially only one member or a specific small number of members using a conversation site even with a "group" value of the parameter indicating a site of message exchange for a group.

FIGS. 6A and 6B each illustrate an example of processing for the group conversation site, which is executed by the bot service 321.

Each example illustrated in FIGS. 6A and 6B shows the processing only for an explicit print instruction given to the group conversation site by the user.

Processing in step S601 of the flowchart in FIG. 6A is started as a result of determination by the bot service 321 that the conversation site is a group site.

In step S601, the bot service 321 first analyzes the user's message to determine whether the user message is an explicit print instruction. For example, there is a method of determination using a specific parameter of print metadata and a term in the message. For example, FIGS. 18A to 18C each illustrate the example of the event metadata information, and the parameter of "event_type" refers to an event type. In this example, a value 1804 of "mention" in the parameter of "event_type" in FIG. 18C indicates that the event is a message designating a specific party at the other end. Furthermore, if the message designates the print bot and a term related to print appears in the message in such a manner as "@Print_Bot, please print file xxxx" as described in a message 1401 illustrated in FIG. 14A and a value 1805 illustrated in FIG. 18C, the message is determined to be an explicit instruction. If the bot service 321 determines that the message is an explicit instruction (YES in step S601), the processing proceeds to step S602. In step S602, the bot service 321 identifies a user who has given the instruction. Subsequently, in step S603, the bot service 321 designates the identified user, and makes a suggestion for confirming the instruction (e.g., writing of a message to the chat room).

FIG. 6B illustrates a more specific example of making the suggestion.

Figure 14A:
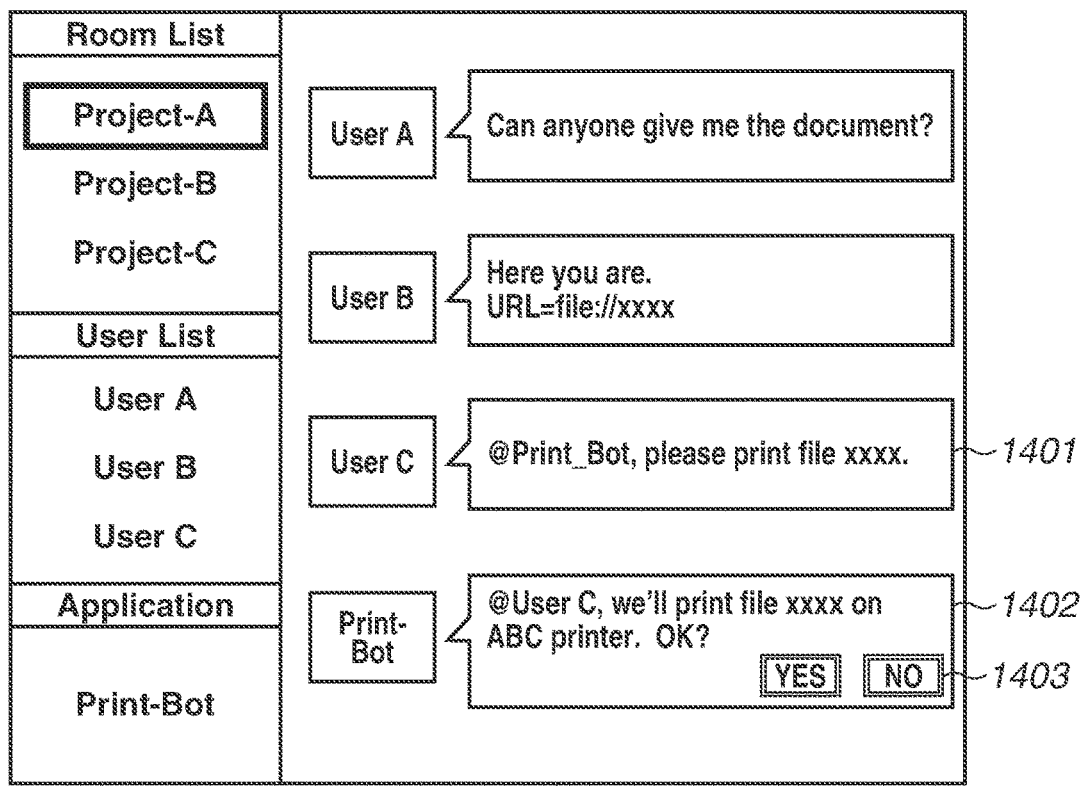
FIGS. 14A and 14B are diagrams each illustrating an example of conversation with the bot service according to the first exemplary embodiment.

In step S611, for example, the bot service 321 makes an inquiry of user authentication to the print server 103 about whether the identified user really exists. Subsequently, in step S612, the bot service 321 makes a determination about the user authentication in a response from the print server 103. If the bot service 321 determines that the user authentication has succeeded (SUCCEEDED in step S612), the processing proceeds to step S615. In step S615, the bot service 321 acquires print environment information based on the user from the print server 103. Examples of the print environment information include a printer identification (ID), a printer type, and default print settings. Subsequently, in step S616, the bot service 321 generates a message asking the user to confirm execution of print. For example, the bot service 321 generates a message such as a message 1402 "@User C, we'll print file xxxx on ABC printer. OK?" as illustrated in FIG. 14A. In step S617, the bot service 321 at this time generates UI control components for a response by the user to prevent addition of an extra message during group conversation. For example, the bot service 321 generates buttons such as a "YES" button and a "NO" button 1403 illustrated in FIG. 14A as the UI control components. Subsequently, in step S618, the bot service 321 combines the generated message and the UI control components and transmits the combined message to the message application server 101. In contrast, if the bot service 321 determines that the user authentication has failed (FAILED in step S612), the processing proceeds to step S613. In step S613, the bot service 321 generates a message that the user authentication has failed. For example, the bot service 321 generates a message such as "The user authentication has failed". Subsequently, in step S614, the bot service 321 transmits the generated message to the message application server 101.

Figure 7A:
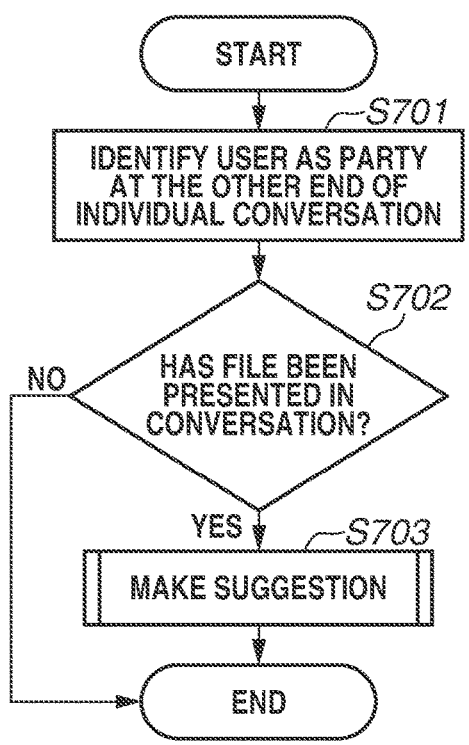
FIGS. 7A and 7B are flowcharts each illustrating an example of processing of the bot service according to the first exemplary embodiment.
Figure 7B:
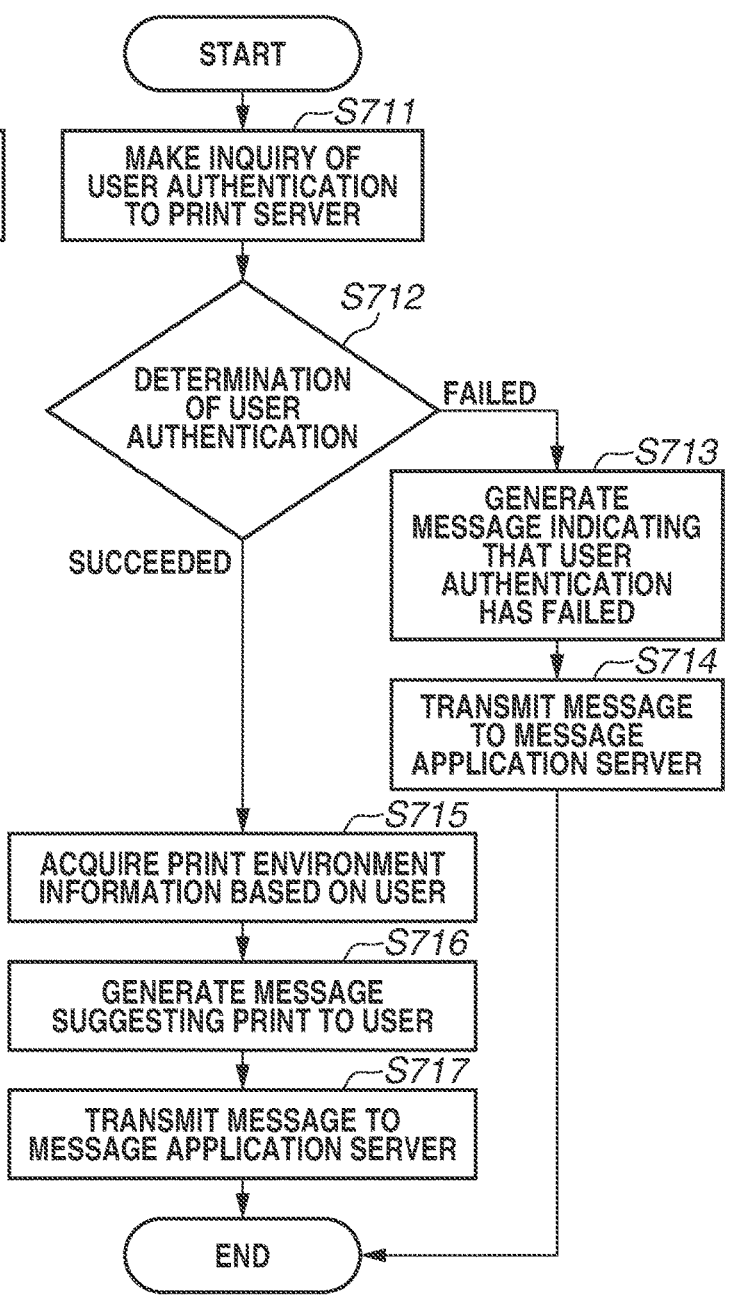

FIGS. 7A and 7B each illustrate an example of processing for the individual conversation site, which is executed by the bot service 321.

FIGS. 7A and 7B each illustrate the example in which, as a result of the determination by the bot service 321 that the conversation site is an individual conversation site, the bot service 321 makes a suggestion in response to presentation (uploading) of a file to the individual conversation site by the user (i.e., in response to detection of uploading).

Processing in step S701 of the flowchart in FIG. 7A is started as a result of the bot service 321 detecting the uploading of a file and then determining that the conversation site is an individual conversation site, and further determining that the message is not a response to the bot's suggestion.

Figure 14B:
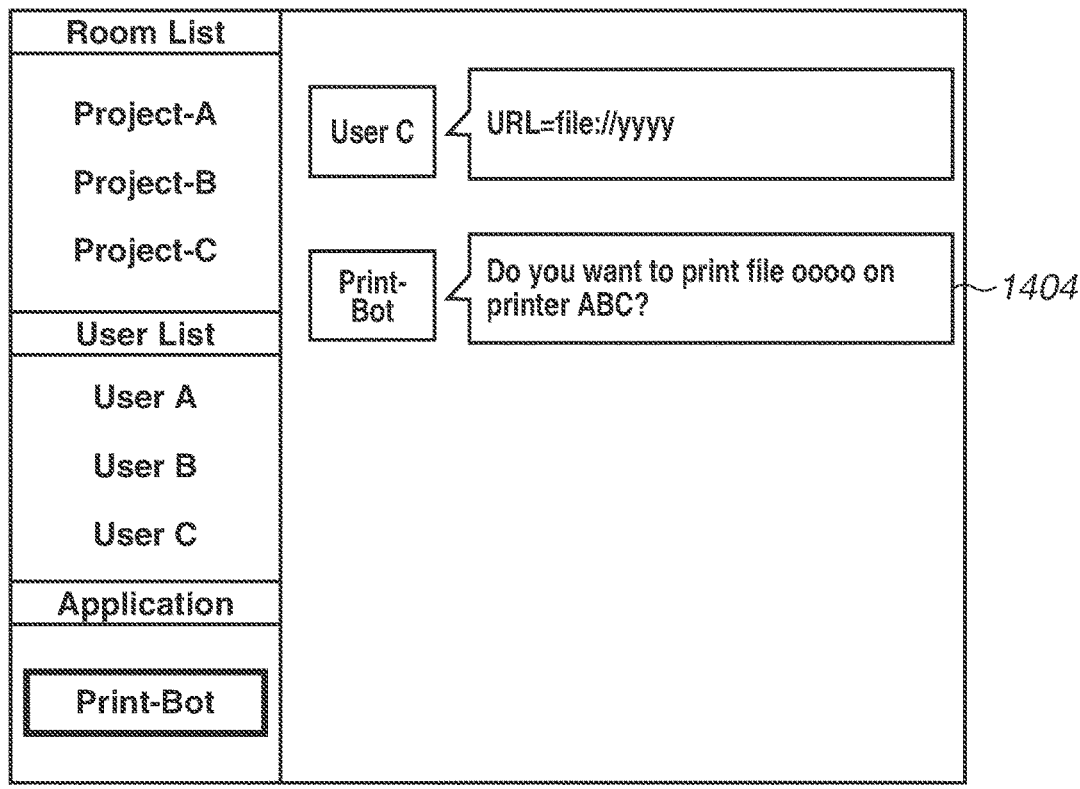

In step S701, the bot service 321 first identifies a user as the party at the other end of the individual conversation with the print bot. Subsequently, in step S702, the bot service 321 determines whether a file has been presented (uploaded) in a message in the conversation. If the file has been presented in the message (YES in step S702), the processing proceeds to step S703. In step S703, the bot service 321 suggests print of the file. For example, the bot service 321 generates a message such as a message 1404 "Do you want to print file oooo on printer ABC?" as illustrated in FIG. 14B and transmits the message to the message application server 101. In this processing, the message is written on a page of the chat room. FIG. 7B illustrates a specific procedure for making the suggestion. The processing illustrated in FIG. 7B is the same as the processing illustrated in FIG. 6B except for the processing in step S615, so that a description of the same content will be omitted. The absence of the processing in step S615 in FIG. 7B indicates that the user can make a response of "YES" or "NO" in a message, instead of by a command, because the conversation site is an individual conversation site and thus there is no need to pay attention to other users. As a matter of course, a command for a response in the message can be combined in a similar manner to the processing illustrated in FIG. 6B.

FIG. 8 illustrates an example of processing for the response by the user, which is executed by the bot service 321.

FIG. 8 illustrates the example in which the bot service 321 transmits to the print server 103 the print instruction and the file in response to the user's response.

Processing in step S801 of the flowchart in FIG. 8 is started as a result of determination by the bot service 321 that the event that has occurred is a message from or a response by the user through an operation of a UT control component. In step S801, the bot service 321 first determines whether the type of the user's response is affirmation or negation.

If the user replies "YES" in the message or presses a UI control button indicating "YES", the type of the response is determined to be an affirmation. If the user replies "NO" in the message or presses a UI control button indicating "NO", the type of the response is determined to be a negation. In response to the response determined to be an affirmation (AFFIRMATION in step S801), the processing proceeds to step S802. In step S802, the bot service 321 determines whether the user authentication has been made with respect to the print server 103. If the bot service 321 determines that the user authentication has been made (YES in step S802), the processing proceeds to step S803. In step S803, the bot service 321 acquires a file as the print target from the message application server 101. Subsequently, in step S804, the bot service 321 transmits the print instruction and the acquired file described above to the print server 103. In contrast, if the response is determined to be a negation (NEGATION in step S801), the bot service 321 executes nothing. If determining that the user authentication has not been made (NO in step S802), the processing proceeds to step S805. In step S805, the bot service 321 makes the user authentication with respect to the print server 103. The processing in steps S805 to S808 is the same as that in steps S711 to S714 illustrated in FIG. 7B, so that a description thereof will be omitted.

As described above, the bot service 321 determines whether the conversation site is a group conversation site or an individual conversation site, and controls transmission of a message as appropriate according to each site. This can prevent unnecessary intervention by the bot in conversation among users. Since the bot service 321 waits for a print instruction even while intervention is prevented, print can be executed as soon as the print instruction is given. This can prevent a decrease in convenience.

A second exemplary embodiment will be described. The description has been given of the first exemplary embodiment using the example of preventing intervention of the print bot in conversation according to a type of the conversation site.

In the present exemplary embodiment, a description will be given of a method of switching action of the print bot based on a reaction by the user to the print bot's suggestion even at the individual conversation site.

Specific processing according to the present exemplary embodiment will be described with reference to FIG. 9.

Only the difference from the first exemplary embodiment will be described here. In the present exemplary embodiment, a system configuration, a hardware/software configuration, and each process are the same as those of the first exemplary embodiment with some exceptions, so that a description of the same content will be omitted.

Figure 9:
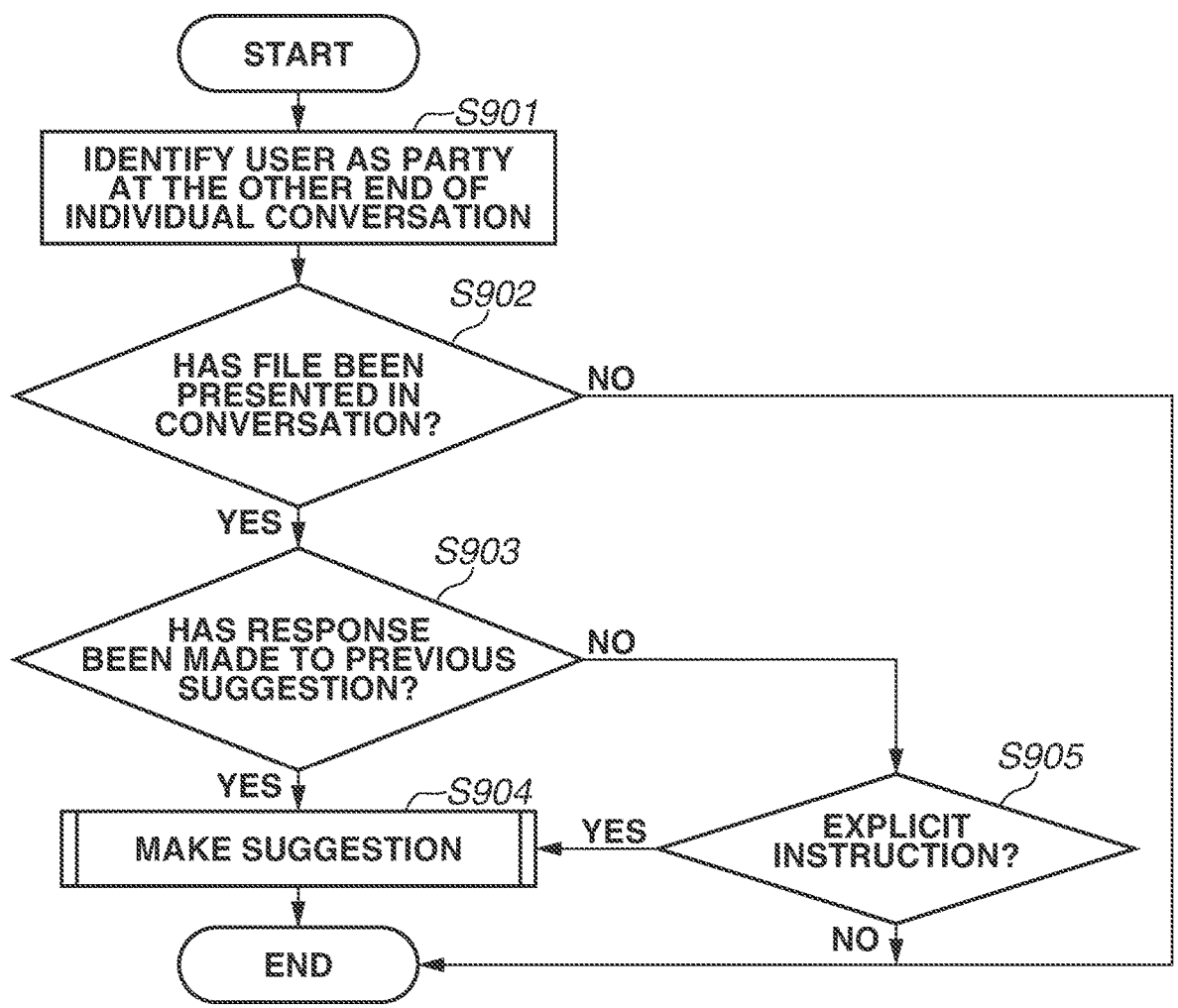
FIG. 9 is a flowchart illustrating an example of processing of a bot service according to a second exemplary embodiment.

FIG. 9 illustrates an example of preventing a suggestion by the bot service 321 at the individual conversation site with no reaction from the user to a previous suggestion by the bot service 321.

Processing in step S901 of the flowchart in FIG. 9 is started as a result of the bot service 321 determining that the conversation site is an individual conversation site and further determining that the message is not an response to the bot's suggestion.

The processing in step S901 to S902 is the same as the processing in steps S701 to S702 illustrated in FIG. 7A, so that a description thereof will be omitted.

If the bot service 321 determines that a file has been presented in the message (YES in step S902), the processing proceeds to step S903. In step S903, the bot service 321 determines whether there has been a response by the user to the print bot's previous suggestion, or the previous suggestion has been neglected. If there has been a response to the previous response (YES in step S903), the processing proceeds to step S904. In step S904, the bot service 321 suggests print to the user also at this time. The detailed processing of suggesting print to the user at this time is the same as that illustrated in FIG. 7B, so that a description thereof will be omitted. If there has been no response to the print bot's previous suggestion (NO in step S903), the processing proceeds to step S905. In step S905, the bot service 321 analyzes the user's message to determine whether the user's message is an explicit print instruction. The processing in step S905 is the same as the processing in step S601 illustrated in FIG. 6A, so that a description thereof will be omitted. If the bot service 321 determines that the user's message is an explicit instruction (YES in step S905), the processing proceeds to step S904. In step S904, the bot service 321 makes a suggestion for confirming execution of print to the user.

The detailed processing of making a suggestion for confirming execution of print to the user at this time is the same as that illustrated in FIG. 6B, so that a description thereof will be omitted. In contrast, if the user's message is determined to be not an explicit instruction (NO in step S905), the bot service 321 suggests nothing.

According to the present exemplary embodiment described above, in response to no reaction by the user to the previous suggestion by the bot service 321 at the individual conversation site, the bot service 321 automatically becomes to wait for an explicit instruction and a suggestion by the bot service 321 is prevented. Thus, the bot's suggestion can be prevented according to the convenience of the user.

A third exemplary embodiment will be described. In the second exemplary embodiment, the description has been given of the method of switching action of the print bot according to the user's reaction to the print bot's suggestion even at the individual conversation site.

In the present exemplary embodiment, a description will be given of a method of presenting an option of "STANDBY" in response to the print bot's suggestion, and switching to a standby status of waiting for an instruction by the user.

Specific processing according to the present exemplary embodiment will be described with reference to FIGS. 10A to 10C, FIG. 11, and FIG. 15.

Only the difference from the first and second exemplary embodiments will be described here. In the present exemplary embodiment, a system configuration, a hardware/software configuration, and each process are the same as those of the first exemplary embodiment with some exceptions, so that a description of the same content will be omitted.

Figure 10A:
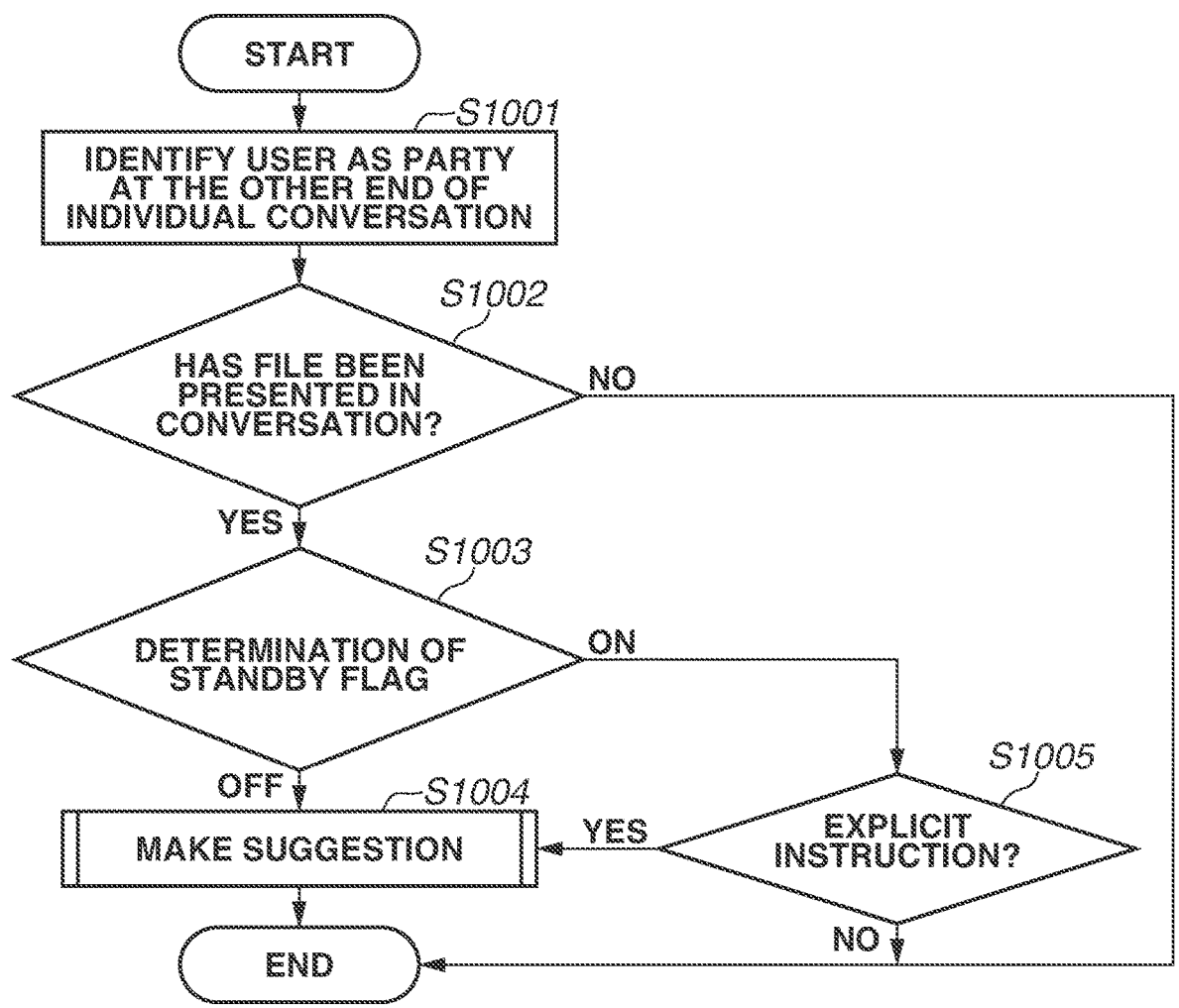

FIGS. 10A to 10C each illustrate an example in which the option of "STANDBY" in a suggestion by the bot service 321 is prepared at the individual conversation site, and with the "STANDBY" selected by the user, the bot service 321 is prevented from making a suggestion until receiving an explicit instruction.

Processing in step S1001 of the flowchart in FIG. 10A is started as a result of the bot service 321 determining that the conversation site is an individual conversation site and further determining that the message is not a response to the bot's suggestion. The processing in steps S1001 to S1002 is the same as that in steps S701 to S702 illustrated in FIG. 7A, so that a description thereof will be omitted.

If the bot service 321 determines that the file has been presented in the message (YES in step S1002), the processing proceeds to step S1003. In step S1003, the bot service 321 determines whether the standby flag is ON or OFF. If the standby flag is ON (ON in step S1003), the bot service 321 determines that the option of "STANDBY" prepared as a proposed response to the suggestion has been selected by the user. If the standby flag is OFF (OFF in step S1003), the bot service 321 determines that the option of "STANDBY" prepared as a proposed response to the suggestion has not been selected by the user. If the standby flag is OFF (OFF in step S1003), the processing proceeds to step S1004. In step S1004, the bot service 321 suggests print to the user. The detailed processing of suggesting print to the user at this time is the same as that illustrated in FIG. 6B, so that a description thereof will be omitted. However, the bot service 321 at this time generates buttons such as the "YES" button, the "NO" button, and a "STANDBY" button as UI control components for the user's response.

FIG. 10B illustrates detailed processing in which the but service 321 suggests print to the user.

Figure 15:
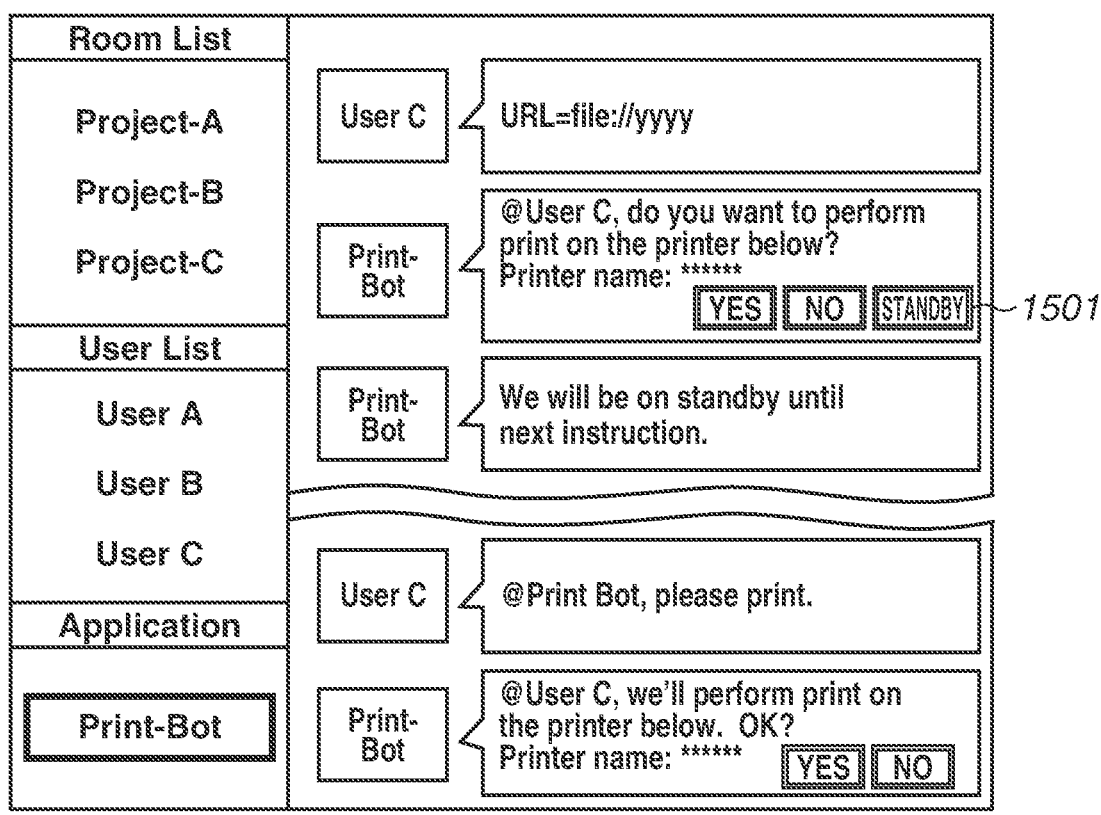
FIG. 15 is a diagram illustrating an example of conversation with the bot service according to the third exemplary embodiment.

The processing in steps S1011 to S1016 is the same as that in steps S711 to S716 illustrated in FIG. 7B, so that a description thereof will be omitted. In step S1017, after generating a message to suggest prim to the user in step S1016, the bot service 321 generates UI control components for a response by the user. At this time, the bot service 321 adds a UI control component such as a "STANDBY" button 1501 as illustrated in FIG. 15 to typical UI control components for affirmation and negation such as the "YES" and "NO" buttons. Subsequently, in step S1018, the bot service 321 combines the generated message and the UI control components and transmits the combined message to the message application server 101. In contrast, if the standby flag is ON (ON in step S1003), the processing proceeds to step S1005. In step S1005, the bot service 321 determines whether the message is an explicit instruction from the user. The processing in step S1005 is the same as that in step S601 illustrated in FIG. 6A, so that a description thereof will be omitted. In contrast, if the message is determined to be not an explicit instruction (NO in step S1005), the bot service 321 suggests nothing. If the message is determined to be an explicit instruction (YES in step S1005), the processing proceeds to step S1004. In step S1004, the bot service 321 makes a suggestion for confirming execution of print to the user.

FIG. 10C illustrates detailed processing in which the bot service 321 makes a suggestion for confirming execution of print to the user.

The processing in steps S1021 to S1028 is the same as that in steps S611 to S616 illustrated in FIG. 6B, so that a description thereof will be omitted.

In step S1029, after combining the generated message and the UI control components and transmitting the combined message to the message application server 101 in step S1028, the bot service 321 resets the standby flag to OFF.

Figure 11:
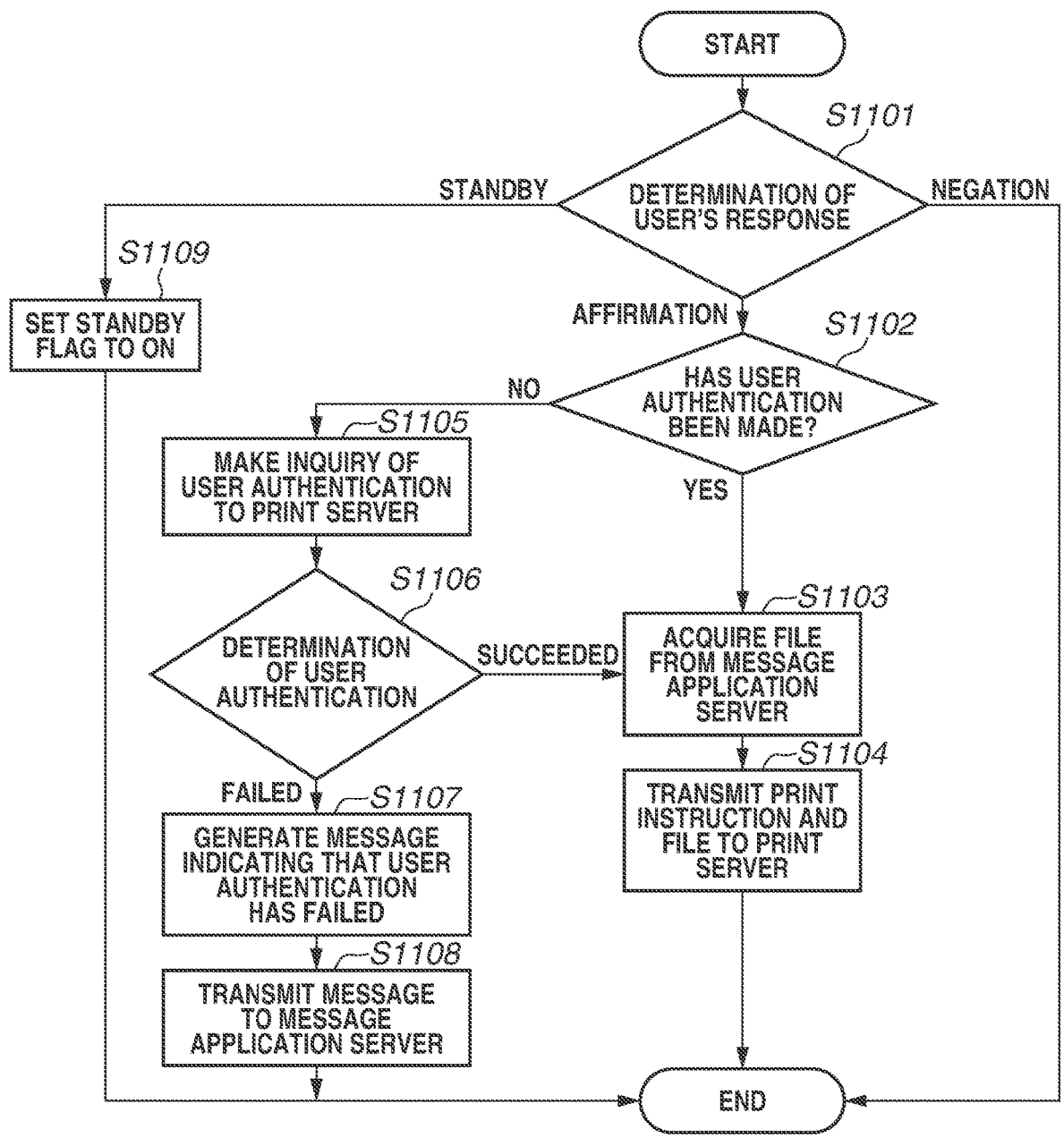
FIG. 11 is a flowchart illustrating an example of processing of the bot service according to the third exemplary embodiment.

FIG. 11 illustrates an example of processing with respect to the user's response, which is executed by the bot service 321.

The example illustrated in FIG. 11 shows processing with a UI control component such as the "STANDBY" button added to UI control components for affirmation and negation such as the "YES" and "NO" buttons in a suggestion by the bot service 321.

Processing in step S1101 of the flowchart in FIG. 11 is started as a result of determination by the bot service 321 that the event that has occurred is a response by the user through an operation of a UI control component or a message. The processing in steps S1101 to S1108 is the same as that in steps S801 to S808 illustrated in FIG. 8, so that a description thereof will be omitted.

If the type of the user's response is determined to be "STANDBY" (STANDBY in step S1101), the processing proceeds to step S1109. In step S1109, the bot service 321 sets the standby flag to ON.

According to the present exemplary embodiment, the bot service 321 presents the option of "STANDBY" in the print bot's suggestion and switches to the standby status of waiting for the user's instruction, and then waits for an explicit instruction. This configuration prevents a suggestion by the bot service 321.

Thus, the bots suggestion can be prevented according to the convenience of the user.

A fourth exemplary embodiment will be described. The description has been given of the first exemplary embodiment using the example of preventing intervention of the print bot in conversation according to a type of the conversation site.

In the present exemplary embodiment, a description will be given of a method by which the print bot, as an exception, makes a suggestion to the user even at the group conversation site for a file presented with a specific name.

Figure 16:
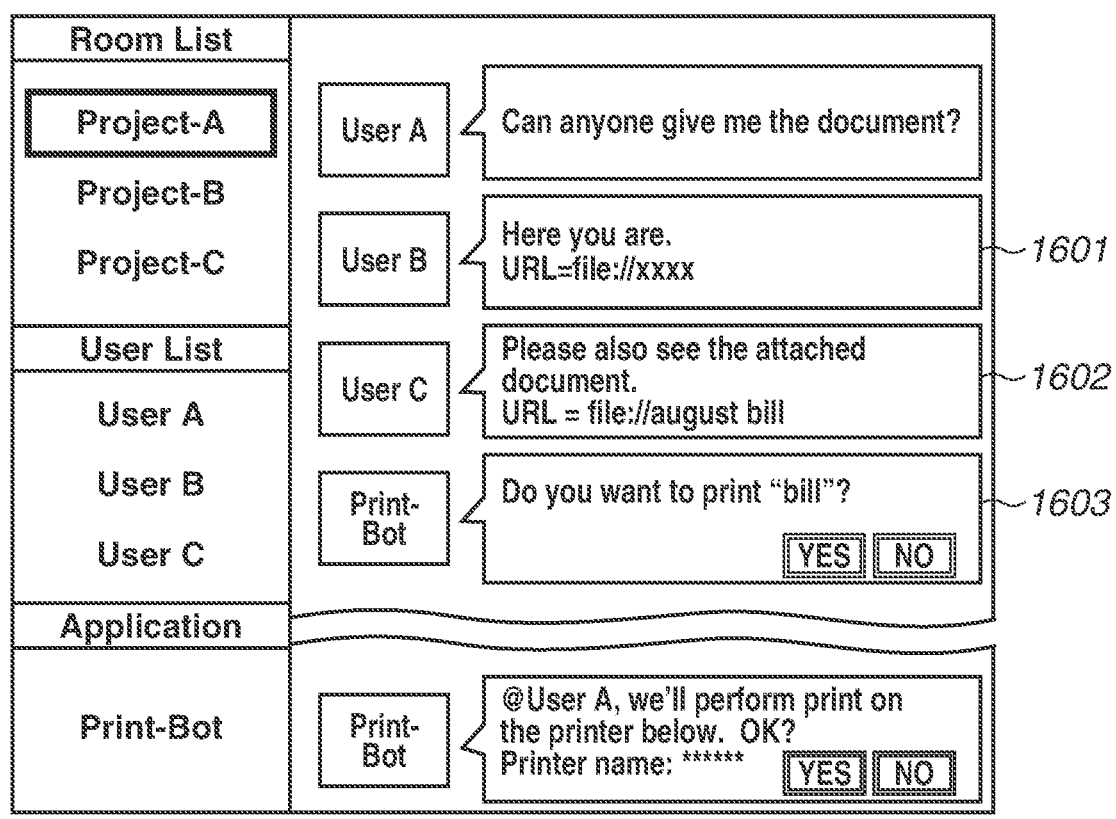
FIG. 16 is a diagram illustrating an example of conversation with the bot service according to the fourth exemplary embodiment.

Specific processing according to the present exemplary embodiment will be described with reference to FIGS. 12 and 16.

Only the difference from the first exemplary embodiment will be described here. In the present exemplary embodiment, a system configuration, a hardware/software configuration, and each process are the same as those of the first exemplary embodiment with some exceptions, so that a description of the same content will be omitted.

Figure 12:
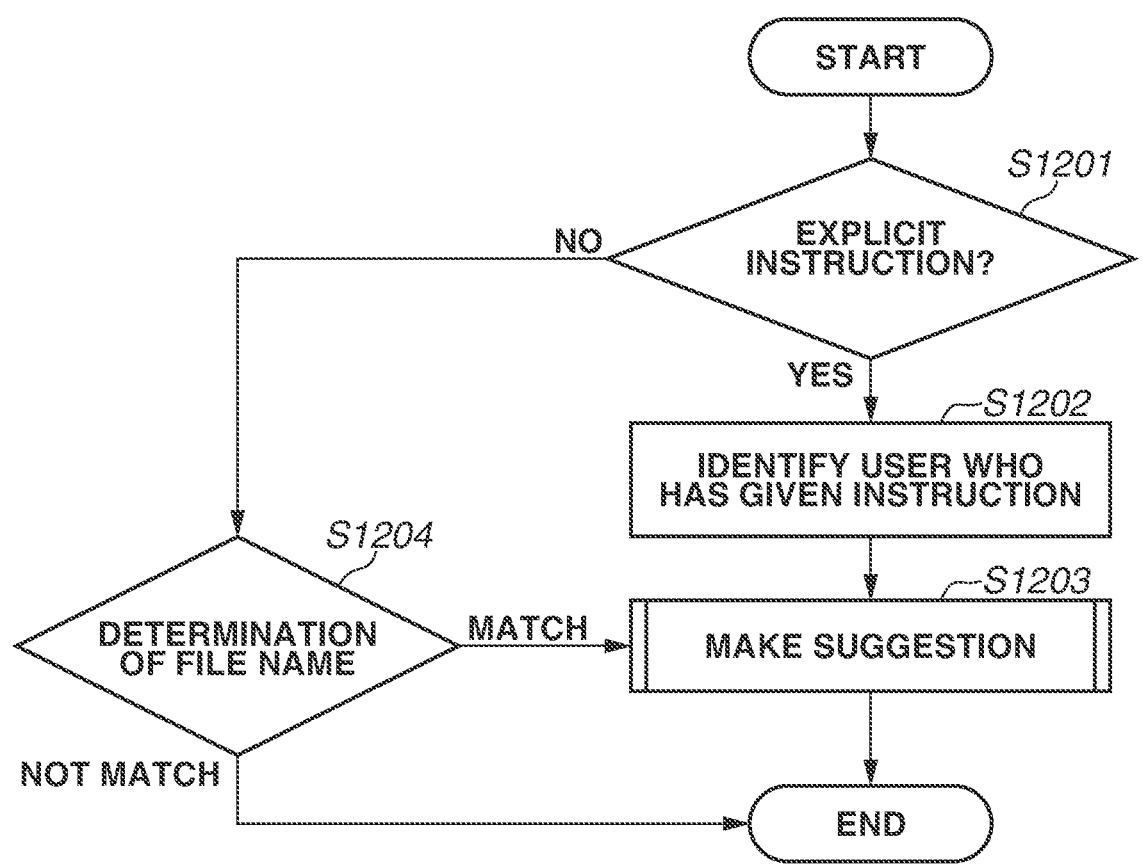
FIG. 12 is a flowchart illustrating an example of processing of a bot service according to a fourth exemplary embodiment.

FIG. 12 illustrates an example of processing for the group conversation site, which is executed by the bot service 321.

The example illustrated in FIG. 12 shows processing not only for an explicit print instruction given to the group conversation site by the user, but also for a file presented under a file name that includes a specific keyword.

Processing in step S1201 of the flowchart in FIG. 12 is started as a result of determination by the bot service 321 that the conversation site is a group site.

The processing in step S1201 to S1203 is the same as the processing in steps S601 to S603 illustrated in FIG. 6A, so that a description thereof will be omitted.

If the message is determined to be not an explicit instruction (NO in step S1201), the processing proceeds to step S1204. In step S1204, the bot service 321 determines whether the file name of a file presented (uploaded) in the message includes a word that matches with any specific keyword designated in advance. If the file name of the file presented in the message includes the word (MATCH in step S1204), the processing proceeds to step S1203. In step S1203, the bot service 321 suggests print to the user. The detailed processing of suggesting print to the user at this time is the same as that illustrated in FIG. 7B, so that a description thereof will be omitted. FIG. 16 illustrates a UI example in which a keyword "bill" is designated, according to the present exemplary embodiment. Since the file name in a message 1601 does not include the keyword, the bot service 321 does not suggest anything at this time. However, since the file name in a message 1602 includes the keyword, the bot service 321 suggests punt as described in a message 1603. In contrast, if the file name does not include a word that matches with the keyword (NOT MATCH in step S1204), the bot service 321 suggests nothing.

As described above, according to the present exemplary embodiment, the bot service 321 can avoid overlooking an important file by the print bot making a suggestion with respect to a specific file, even while the print bot is prevented from making a suggestion at the group conversation site.

A fifth exemplary embodiment will be described. The description has been given of the first exemplary embodiment using the example of preventing the intervention of the print bot in conversation according to a type of the conversation site.

In the present exemplary embodiment, a description will be given of a method by which the print bot, as an exception, makes a suggestion to the user even at the group conversation site at specific time, on a specific day, or on a specific date.

Figure 17A:
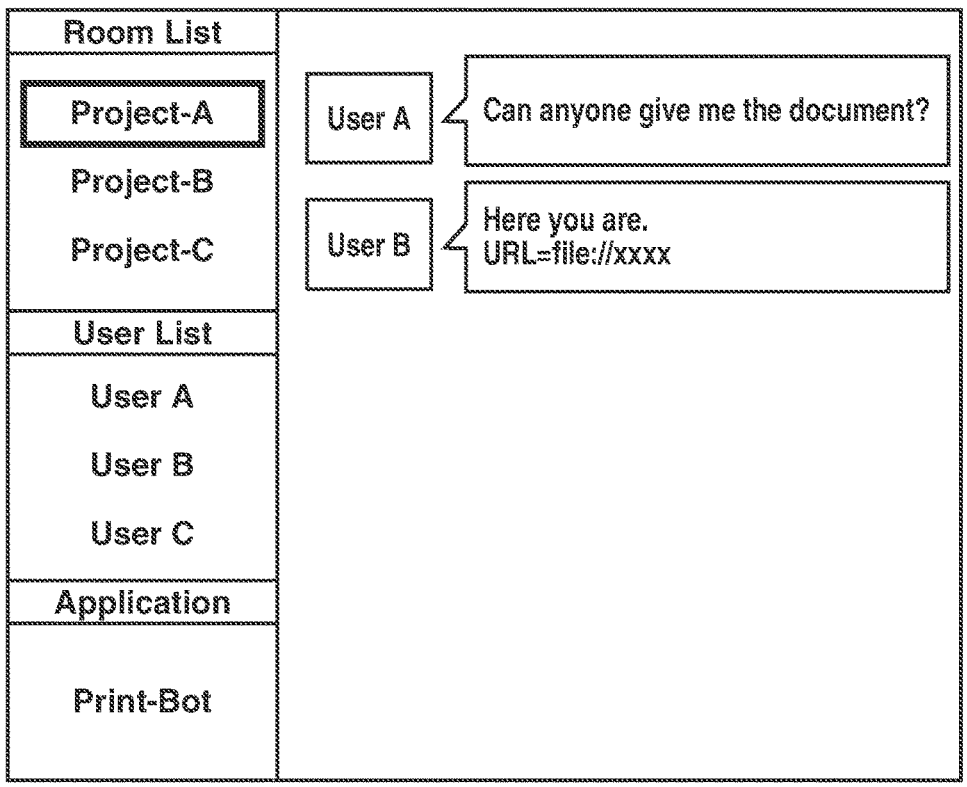
FIGS. 17A and 17B are diagrams each illustrating an example of conversation with the bot service according to the fifth exemplary embodiment.
Figure 17B:
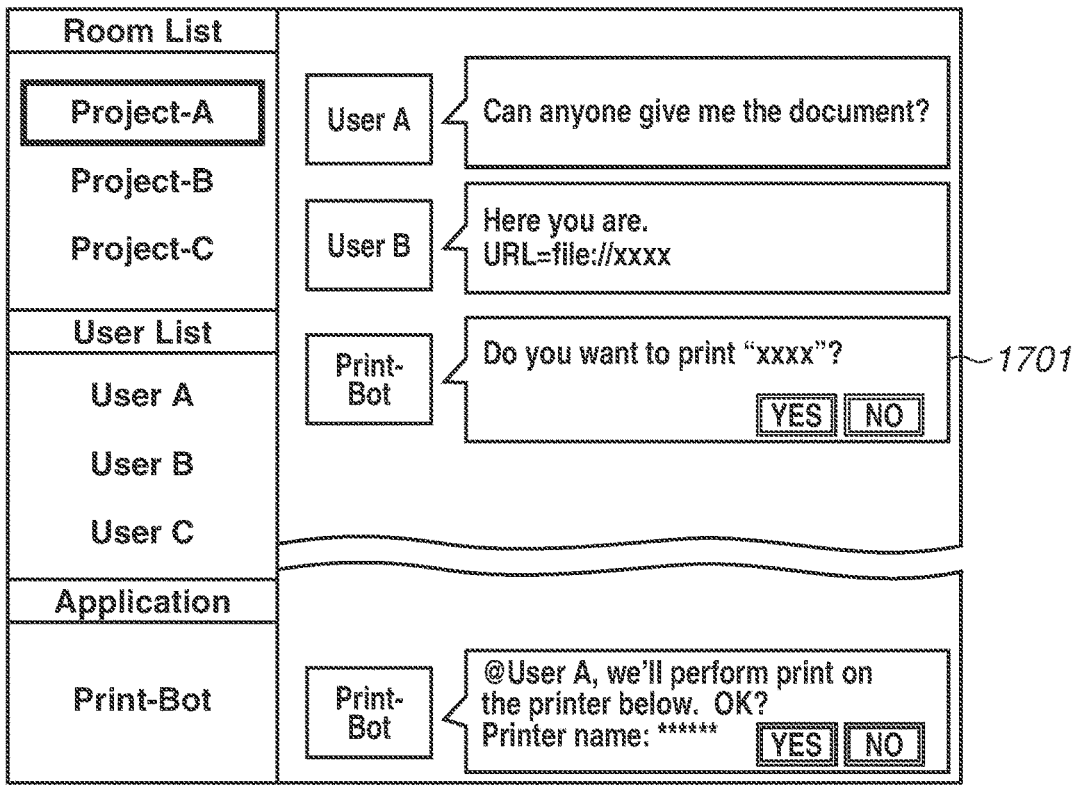

Specific processing according to the present exemplary embodiment will be described with reference to FIG. 13 and FIGS. 17A and 17B.

Only the difference from the first exemplary embodiment will be described here. In the present exemplary embodiment, a system configuration, a hardware/software configuration, and each process are the same as those of the first exemplary embodiment with some exceptions, so that a description of the same content will be omitted.

Figure 13:
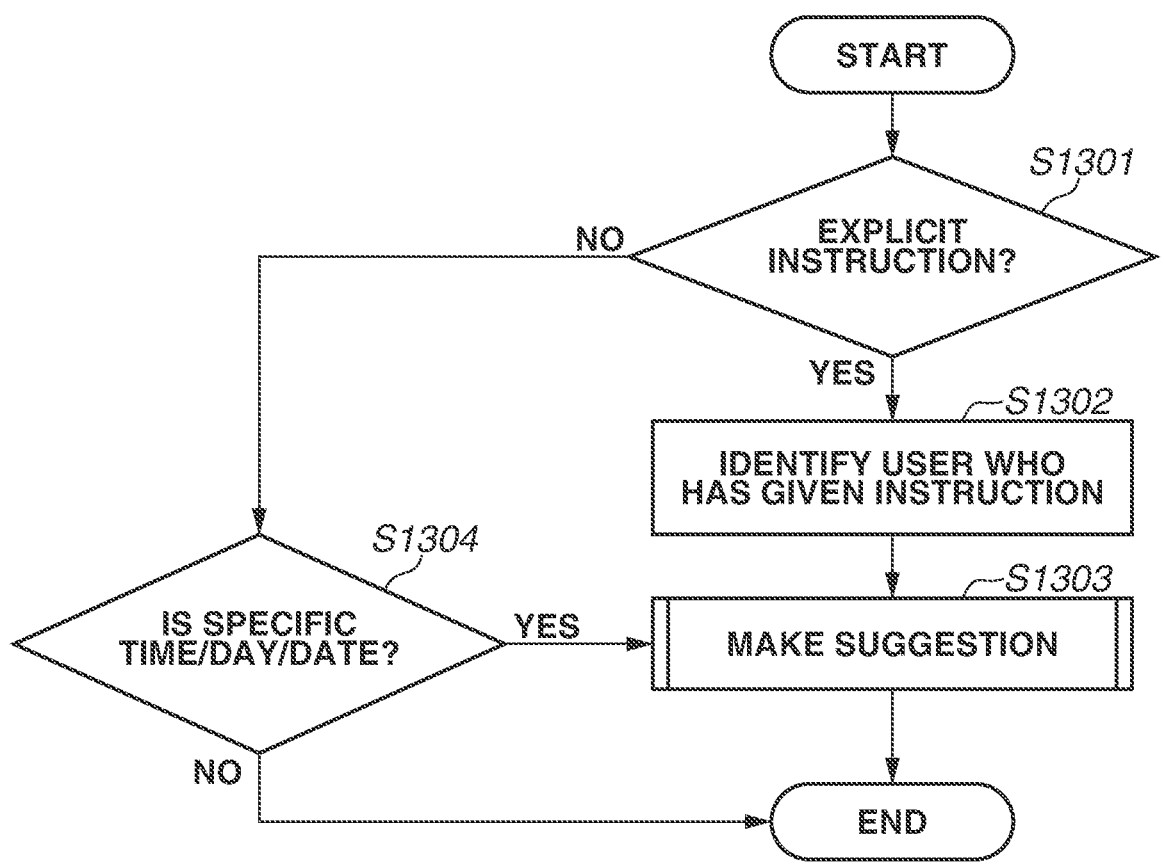
FIG. 13 is a flowchart illustrating an example of processing of a bot service according to a fifth exemplary embodiment.

FIG. 13 illustrates an example of processing for the group conversation site, which is executed by the bot service 321.

FIG. 13 illustrates an example of executing the processing not only for an explicit print instruction given to the group conversation site by the user but also for a specific day of the week.

Processing in step S1301 of the flowchart in FIG. 13 is started as a result of determination by the bot service 321 that the conversation site is a group site.

The processing in steps S1301 to S1303 is the same as the processing in steps S601 to S603 illustrated in FIG. 6A, so that a description thereof will be omitted.

If the message is determined to be not an explicit instruction (NO in step S1301), the processing proceeds to step S1304. In step S1304, the bot service 321 acquires the day of the week when receiving the message from the control unit 231 of the print server 103, and determines whether the day of the week matches with a specific day of the week that has been designated in advance. If the day of the week does not match with the specific day (NO in step S1304), the bot service 321 suggests nothing as illustrated in FIG. 17A. If the day of the week when the bot service 321 has received the message matches with the specific day (YES in step S1304), the processing proceeds to step S1303. In step S1303, the bot service 321 suggests print to the user as described in a message 1701 of FIG. 17B. The detailed processing of suggesting print to the user at this time is the same as that illustrated in FIG. 7B, so that a description thereof will be omitted.

While the description has been given of the present exemplary embodiment using the example of a day of the week, time or a date can be employed in a similar manner.

As described above, according to the present exemplary embodiment, the bot service 321 can enhance the convenience according to the convenience of the user by the print bot making a suggestion at specific time, on a specific day, or on a specific date even while the print bot is prevented from making a suggestion at the group conversation site.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-215449, filed Nov. 28, 2019, which is hereby incorporated by reference herein in its entirely.

What is claimed is:

1. A control method performed by executing an application, the control method comprising:
   recognizing that a file is uploaded to a chat room;
   determining whether the chat room is a chat room designed for only one user and the application to join, or a chat room designed for users to join; and
   based on a determination that the chat room is a chat room designed for only one user and the application to join, providing a message regarding printing of the file to the chat room, and
   based on a determination that the chat room is a chat room designed for the users to join, not providing the message,
   wherein the determination is made based on an identifier of the chat room.

2. The control method according to claim 1, wherein the determination is made based on information indicating a type of the chat room.

3. The control method according to claim 1, wherein the determination is made based on counting a number of users that join the chat room.

4. The control method according to claim 1, wherein the message is a message for confirming the printing of the file.

5. The control method according to claim 1, wherein the application has joined the chat room designed for users to join when the determination is made.

6. A server system including an application, the server system comprising:
   one or more processors configured to:
      recognize that a file has been uploaded to a chat room;
      determine whether the chat room is a chat room designed for only one user and the application to join, or a chat room designed for users to join; and
      based on a determination that the chat room is a chat room designed for only one user and the application to join, provide a message regarding printing of the file to the chat room, and
      based on a determination that the chat room is a chat room designed for the users to join, not provide the message,
      wherein the determination is made based on an identifier of the chat room.

7. The server system according to claim 6, wherein the determination is made based on information indicating a type of the chat room.

8. The server system according to claim 6, wherein the determination is made based on counting a number of users that join the chat room.

9. The server system according to claim 6, wherein the message is a message for confirming the printing of the file.

10. The server system according to claim 6, wherein the application has joined the chat room designed for users to join when the determination is made.

11. A control method performed by executing an application, the control method comprising:
    recognizing that a file is uploaded to a chat room;
    determining whether only one user and the application are in the chat room; and
    based on a determination that only one user and the application are in the chat room, providing a message regarding printing of the file to the chat room, and
    based on not determining that only one user and the application are in the chat room, not providing the message,
    wherein the determination is made based on an identifier of the chat room.

* * * * *